United States Patent
Yamaguchi et al.

(10) Patent No.: US 7,229,717 B2
(45) Date of Patent: Jun. 12, 2007

(54) ANODE ACTIVE MATERIAL AND BATTERY USING IT

(75) Inventors: Akira Yamaguchi, Fukushima (JP); Satoshi Mizutani, Fukushima (JP); Hiroshi Inoue, Fukushima (JP); Koji Sekai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/232,304

(22) Filed: Sep. 21, 2005

(65) Prior Publication Data

US 2006/0068285 A1    Mar. 30, 2006

(30) Foreign Application Priority Data

Sep. 30, 2004   (JP) ............................. P2004-289414

(51) Int. Cl.
*H01M 4/58* (2006.01)

(52) U.S. Cl. ................. 429/231.95; 429/219; 429/220; 429/221; 429/223; 429/224; 429/229; 429/231.5; 429/231.6; 429/311; 429/316; 429/317; 429/324; 429/326; 429/329; 429/330; 429/337; 429/338

(58) Field of Classification Search .......... 429/231.95, 429/219, 220, 221, 223, 224, 229, 231.5, 429/231.6, 311, 316, 317, 324, 326, 329, 429/330, 337, 338
See application file for complete search history.

(56) References Cited

U.S. PATENT DOCUMENTS 4,397,812 A      8/1983  Mallory

| | | |
|---|---|---|
| 2002/0037452 A1 | 3/2002 | Schmidt |
| 2003/0064291 A1 | 4/2003 | Ehrlich |
| 2003/0211390 A1* | 11/2003 | Dahn et al. ............... 429/218.1 |
| 2004/0023116 A1 | 2/2004 | Fujino et al. |
| 2004/0029012 A1 | 2/2004 | Tanizaki et al. |
| 2004/0091775 A1 | 5/2004 | Nishino et al. |
| 2005/0208378 A1 | 9/2005 | Mizutani et al. |
| 2005/0250008 A1 | 11/2005 | Mazutani et al. |
| 2006/0068292 A1* | 3/2006 | Mizutani et al. ......... 429/231.8 |

FOREIGN PATENT DOCUMENTS

| | | |
|---|---|---|
| EP | 1039568 | 9/2000 |
| WO | WO01/48840 | 7/2001 |
| WO | WO2004/086539 | 10/2004 |
| WO | WO2004/100291 | 11/2004 |

* cited by examiner

*Primary Examiner*—Bruce F. Bell
(74) *Attorney, Agent, or Firm*—Sonnenschein Nath & Rosenthal LLP

(57) ABSTRACT

A battery with a high capacity and superior cycle characteristics, and an anode active material used for it are provided. An anode active material contains tin as a first element, a second element, and a third element. The second element is at least one from the group consisting of boron, carbon, aluminum, and phosphorus, and
the third element is at least one from the group consisting of silicon, magnesium, titanium, vanadium, chromium, manganese, iron, cobalt, nickel, copper, zinc, gallium, zirconium, niobium, molybdenum, silver, indium, cerium, hafnium, tantalum, tungsten, and bismuth. The content of the second element in the anode active material is from 9.8 wt % to 49 wt %.

6 Claims, 14 Drawing Sheets

ANODE ACTIVE MATERIAL AND BATTERY USING IT

CROSS REFERENCES TO RELATED APPLICATIONS

The present invention contains subject matter related to Japanese Patent Application JP 2004-289414 filed in the Japanese Patent Office on Sep. 30, 2004, the entire contents of which being incorporated herein by reference.

BACKGROUND OF THE INVENTION

1. Field of the Invention

The present invention relates to an anode active material containing tin (Sn), carbon (C) and the like as an element, and a battery using it.

2. Description of the Related Art

In recent years, many portable electronic devices such as a combination camera (Videotape Recorder), a mobile phone, and a notebook personal computer have been introduced. Downsizing and weight saving of such devices have been made. Regarding a battery used as a portable power source for such electronic devices, particularly a secondary battery, active researches and developments for improving an energy density have been actively promoted as a key device. Specially, a nonaqueous electrolyte secondary battery (for example, lithium ion secondary battery) can provide a higher energy density compared to a lead battery or a nickel cadmium battery, the traditional aqueous electrolytic solution secondary battery. Therefore, improving the nonaqueous electrolyte secondary battery has been considered in various circles.

As an anode active material used for the lithium ion secondary battery, a carbon material such as non-graphitizable carbon and graphite, which shows a relatively high capacity and has good cycle characteristics is widely used. However, considering that a higher capacity has been requested in these years, there is a task to obtain a higher capacity of the carbon material.

Based on such a background, a technique to attain a high capacity by a carbon material by selecting a raw material for carbonization and preparation conditions has been developed (for example, refer to Japanese Unexamined Patent Application Publication No. H08-315825). However, when such a carbon material is used, the anode discharge potential to lithium is from 0.8 V to 1.0 V, and the battery discharge voltage when the battery is made becomes low. Therefore, in view of the battery energy density, significant improvement is not prospective. Further, there is a disadvantage that large hysteresis is shown in the charge and discharge curve, and the energy efficiency in each charge and discharge cycle is low.

Meanwhile, as an anode with a higher capacity than using the carbon material, researches on an alloy material obtained by applying the fact that a certain metal is electrochemically alloyed with lithium (Li), and the alloy is generated and decomposed reversibly have been promoted. For example, a high capacity anode using Li—Al alloy has been developed, and further, a high capacity anode made of Si alloy has been developed (for example, refer to U.S. Pat. No. 4,950,566).

However, the Li—Al alloy or the Si alloy is swollen and shrinks according to charge and discharge, and the anode is pulverized as every charge and discharge is repeated. Therefore, there is a large disadvantage that the cycle characteristics are significantly poor.

Therefore, as a technique to improve cycle characteristics, coating the surface of the alloy material with a material having high conductivity has been considered (for example, refer to Japanese Unexamined Patent Application Publication Nos. 2000-173669, 2000-173670, and 2001-68096). In the techniques described in these patent documents, the alloy surface is coated with a conductive material by soaking the alloy material in the organic solvent in which a conductive material is dissolved or by a technique using mechanochemical reaction such as hybridization to improve cycle characteristics.

SUMMARY OF THE INVENTION

However, even in the case using such a technique, in reality, effects of improving cycle characteristics are not sufficient, and advantages of the high capacity anode in the alloy material are not fully utilized.

In view of the foregoing, it is desirable to provide a battery with a high capacity and superior cycle characteristics, and an anode active material used for it.

According to an embodiment of the present invention, there is provided an anode active material containing: tin as a first element; a second element; and a third element, wherein the second element is at least one from the group consisting of boron (B), carbon, aluminum (Al), and phosphorus (P), the third element is at least one from the group consisting of silicon (Si), magnesium (Mg), titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), and bismuth (Bi), and the content of the second element is from 9.8 wt % to 49 wt %.

According to an embodiment of the present invention, there is provided a battery including: a cathode; an anode; and an electrolyte, wherein the anode contains an anode active material containing tin as a first element, a second element, and a third element; the second element is at least one from the group consisting of boron, carbon, aluminum, and phosphorus; the third element is at least one from the group consisting of silicon, magnesium, titanium, vanadium, chromium, manganese, iron, cobalt, nickel, copper, zinc, gallium, zirconium, niobium, molybdenum, silver, indium, cerium, hafnium, tantalum, tungsten, and bismuth; and the content of the second element in the anode active material is from 9.8 wt % to 49 wt %.

According to the anode active material of the embodiment of the present invention, tin is contained as the first element. Therefore, the high capacity could be obtained. Further, as the second element, at least one from the group consisting of boron, carbon, aluminum, and phosphorus is contained, and the content of the second element is from 9.8 wt % to 49 wt %. Therefore, a structure with low crystallinity or an amorphous structure can be obtained, and cycle characteristics can be improved. Further, as the third element, at least one from the group consisting of silicon, magnesium, titanium, vanadium, chromium, manganese, iron, cobalt, nickel, copper, zinc, gallium, zirconium, niobium, molybdenum, silver, indium, cerium, hafnium, tantalum, tungsten, and bismuth is contained. Therefore, the capacity can be further increased, or cycle characteristics can be further improved. Consequently, according to the battery using this anode active material of the embodiment of the present invention, the high capacity can be obtained, and superior cycle characteristics can be obtained.

Further, in the battery according to the embodiment of the present invention, when a cyclic ester carbonate derivative having halogen atoms is contained in the electrolyte, decomposition reaction of the solvent in the anode can be inhibited, and cycle characteristics can be further improved. Furthermore, when a cyclic ester carbonate of an unsaturated compound is contained in the electrolyte, cycle characteristics can be improved.

Other and further objects, features and advantages of the invention will appear more fully from the following description.

DETAILED DESCRIPTION OF THE PREFERRED EMBODIMENT

Figure 1:
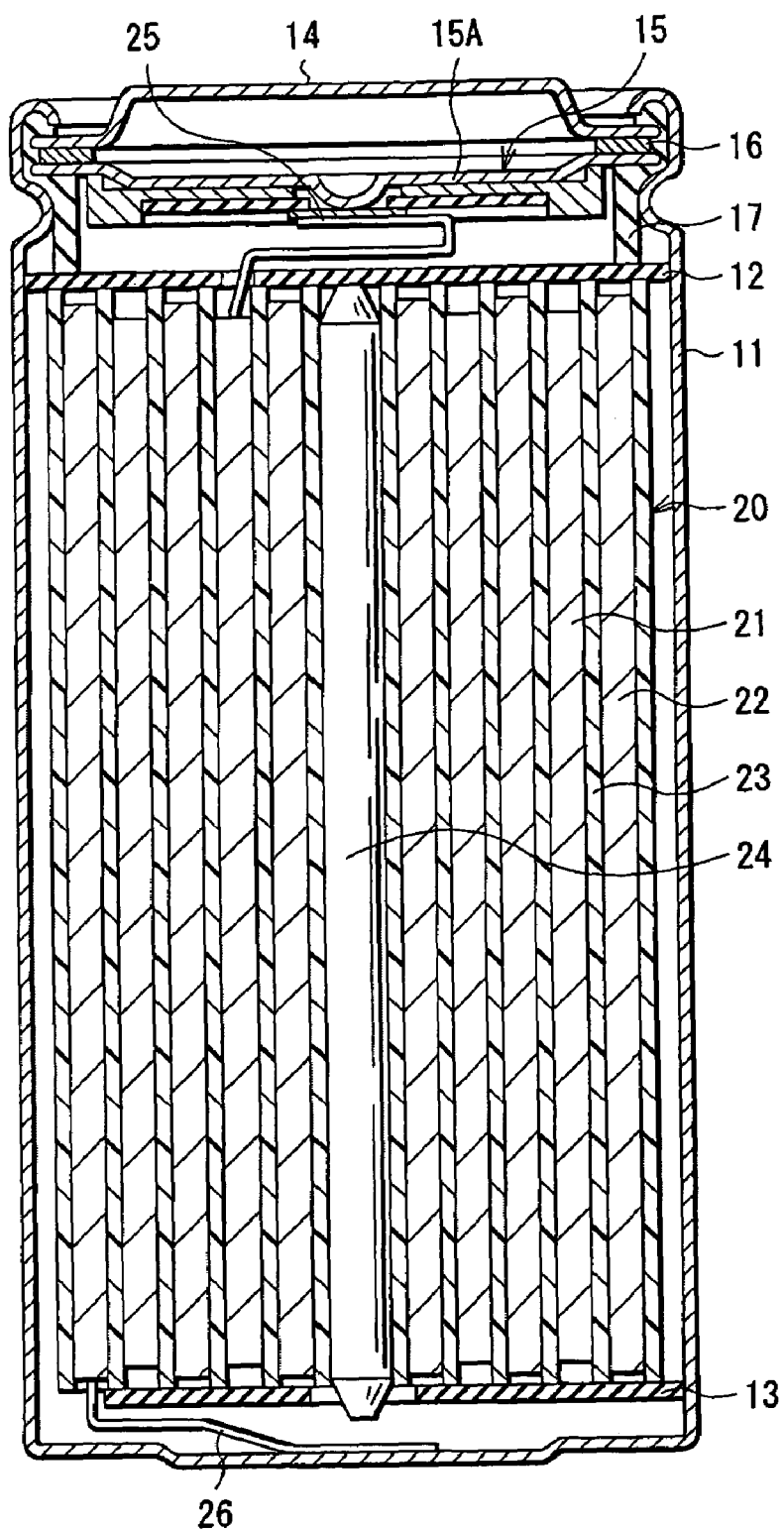
FIG. 1 is a cross section showing a construction of a secondary battery according to an embodiment of the present invention.

An embodiment of the present invention will be hereinafter described in detail with reference to the drawings.

An anode active material according to the embodiment of the present invention is capable of reacting with lithium and the like, and contains tin as a first element. Tin has a high reacting amount to lithium and the like per unit weight, and therefore is capable of increasing the capacity.

The anode active material further contains at least one from the group consisting of boron, carbon, aluminum, and phosphorus as a second element, so that the anode active material can thereby have a structure with low crystallinity or an amorphous structure, lithium can be smoothly inserted and extracted, and reactivity with an electrolyte can be reduced.

The content of the second element in the anode active material is preferably from 9.8 wt % to 49 wt %. When the content is under this range, the effect to obtain the structure with low crystallinity or an amorphous structure is not sufficient. Meanwhile, when the content is over this range, cycle characteristics deteriorate.

The anode active material further contains at least one from the group consisting of silicon, magnesium, titanium, vanadium, chromium, manganese, iron, cobalt, nickel, copper, zinc, gallium, zirconium, niobium, molybdenum, silver, indium, cerium, hafnium, tantalum, tungsten, and bismuth as a third element. Of the foregoing, silicon has a high reacting amount to lithium and the like per unit weight as tin does, and therefore is capable of increasing the capacity. Other elements can further improve cycle characteristics.

The anode active material contains tin, the second element, and the third element and has a reaction phase capable of reacting with lithium and the like. Regarding the reaction phase, the half bandwidth of the diffraction peak obtained by X-ray diffraction where CuKα ray is used as a specific X-ray, and a sweep rate is 1°/min is preferably 1° or more, and desirably 5° or more at a diffraction angle 2θ. When the value is less than 1°, crystallinity is high and sufficient cycle characteristics are difficult to be obtained.

The peak corresponding to the reaction phase capable of reacting with lithium in X-ray diffraction can be easily specified by comparing X-ray diffraction charts before and after electrochemical reaction with lithium. The peak changed after electrochemical reaction with lithium is the peak corresponding to the reaction phase capable of reacting with lithium. In general, the peak of the reaction phase is shown, for example, where 2θ is from 20° to 50°.

Specific examples of the combination of elements of the anode active material include Sn—Co—C, Sn—Fe—C, Sn—Ti—C, Sn—V—C, Sn—Cr—C, Sn—Mn—C, Sn—Ni—C, Sn—Cu—C, Sn—Zn—C, Sn—Zr—C, Sn—Nb—C, Sn—Mo—C, Sn—Ag—C, Sn—Hf—C, Sn—Ta—C, Sn—W—C, Sn—Ga—C, Sn—I—C, Sn—Mg—C, Sn—Ce—C, Sn—Bi—C, Sn—Si—Co—C, Sn—Co—In—C, Sn—Co—In—Ti—C, Sn—Co—B, Sn—Co—Al, and Sn—Co—P.

The anode active material can be manufactured by, for example, mixing raw materials of the respective elements, melting the mixture in an electric furnace, a high frequency inducing furnace, an arc melting furnace or the like, and then solidifying the resultant. Otherwise, the anode active material can be manufactured by, for example, various atomization methods such as gas atomization method and water atomization method, various rolling methods, or a method utilizing mechanochemical reaction such as mechanical alloying method and mechanical milling method. Specially, the anode active material is preferably manufactured by the method utilizing mechanochemical reaction, because the anode active material can thereby obtain the structure with low crystallinity or the amorphous structure. For such a method, for example, a manufacturing device such as a planetary ball mill device and an atliter can be used.

For the raw material, elemental substances of the respective elements can be used by mixing. However, for part of the elements, it is preferable to use alloys. In particular, it is desirable that part or all of tin and the third element is previously alloyed, to which a raw material of the second element is added to synthesize the anode active material by mechanical alloying method. By subsequently adding the second element, the structure with low crystallinity or the amorphous structure can be obtained, and the reaction time can be shortened. The raw materials can be either powders or a lump.

The anode active material is used for a secondary battery as follows, for example.

(First Battery)

FIG. 1 shows a cross section structure of a first battery. The secondary battery is a so-called cylindrical battery, and has a spirally wound electrode body 20, in which a strip-shaped cathode 21 and a strip-shaped anode 22 are layered with a separator 23 inbetween and wound, inside a battery can 11 having the shape of an approximately hollow cylinder. The battery can 11 is made of, for example, iron plated by nickel and its one end is closed, and the other end is opened. Inside the battery can 11, an electrolytic solution as the liquid electrolyte is injected and impregnated in the separator 23. Further, a pair of insulating plates 12 and 13 is respectively arranged perpendicular to the winding periphery face, so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked through a gasket 17. Inside of the battery can 11 is thereby closed. The battery cover 14 is, for example, made of a material similar to that of the battery can 11. The safety valve mechanism 15 is electrically connected to the battery cover 14 through the PTC device 16. When the internal pressure of the battery becomes a certain level or more by internal short circuit, external heating or the like, a disk plate 15A flips to cut the electrical connection between the battery cover 14 and the spirally wound electrode body 20. When temperatures rise, the PTC device 16 limits a current by increasing the resistance value to prevent abnormal heat generation by a large current. The gasket 17 is made of, for example, an insulating material and its surface is coated with asphalt.

The spirally wound electrode body 20 is wound around, for example, a center pin 24. A cathode lead 25 made of aluminum or the like is connected to the cathode 21 of the spirally wound electrode body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 2:
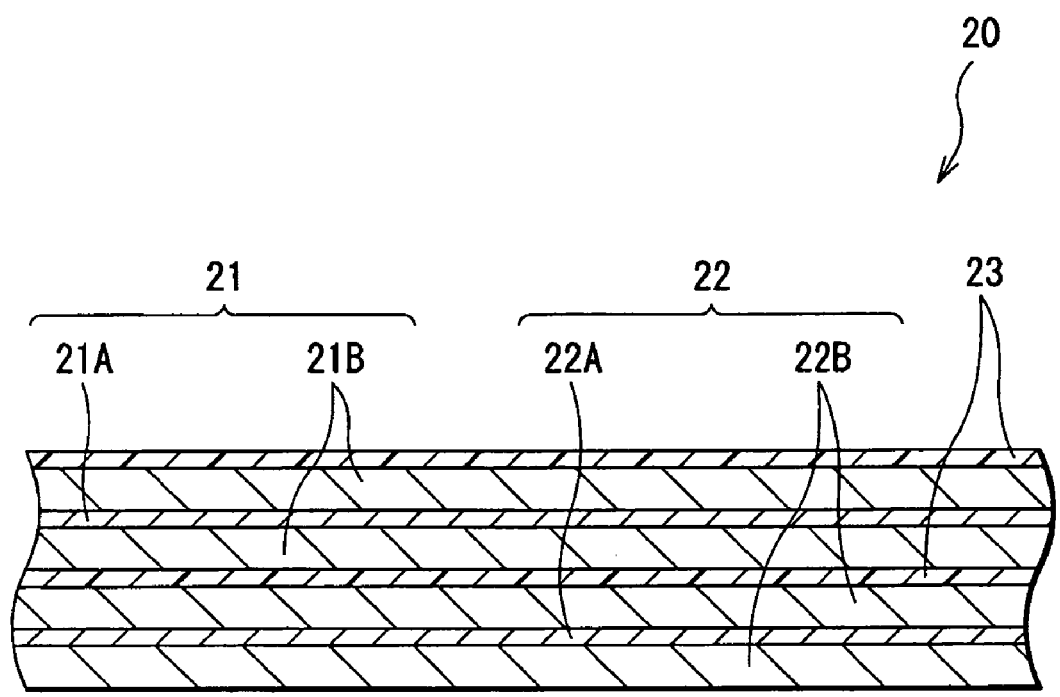
FIG. 2 is a cross section showing an enlarged part of a spirally wound electrode body in the secondary battery shown in FIG. 1.

FIG. 2 shows an enlarged part of the spirally wound electrode body 20 shown in FIG. 1. The cathode 21 has a structure in which, for example, a cathode active material layer 21B is provided on both faces or a single face of a cathode current collector 21A having a pair of opposed faces. The cathode current collector 21A is made of, for example, a metal foil such as an aluminum foil. The cathode active material layer 21B contains, for example, one or more cathode active materials capable of inserting and extracting lithium. If necessary, the cathode active material layer 21B may also contain a conductive agent such as a carbon material and a binder such as polyvinylidene fluoride.

As a cathode active material capable of inserting and extracting lithium, for example, a metal sulfide or a metal oxide containing no lithium, such as titanium sulfide ($TiS_2$), molybdenum sulfide ($MoS_2$), niobium selenide ($NbSe_2$), and vanadium oxide ($V_2O_5$) can be cited. Further, a lithium complex oxide with a main body of $Li_xMO_2$ (in the formula, M represents one or more transition metals. x varies according to charge and discharge states of the battery, and the value of x is generally in the range of $0.05 \leq x \leq 1.10$) can be cited. As the transition metal M constructing the lithium complex oxide, cobalt, nickel, manganese or the like is preferable. As specific examples of such a lithium complex oxide, $LiCoO_2$, $LiNiO_2$, $Li_xNi_yCo_{1-y}O_2$ (in the formula, x and y vary according to charge and discharge states of the battery. In general, x and y are in the range of $0<x<1$ and $0<y<1$), a lithium manganese complex oxide having a spinel-type structure or the like can be cited.

The anode 22 has a structure in which, for example, an anode active material layer 22B is provided on both faces or a single face of an anode current collector 22A having a pair of opposed faces like the cathode 21. The anode current collector 22A is made of, for example, a metal foil such as a copper foil.

The anode active material layer 22B contains, for example, the anode active material according to this embodiment and also contains a binder such as polyvinylidene fluoride if necessary. Since the anode active material according to this embodiment is contained as above, a high capacity can be obtained and cycle characteristics can be improved in the secondary battery. In addition to the anode active material according to this embodiment, the anode active material layer 22B may also contain other anode active material or other material such as a conductive agent. As other anode active material, for example, a carbonaceous material capable of inserting and extracting lithium can be cited. The carbonaceous material is preferable because it can improve charge and discharge cycle characteristics and functions as a conductive agent. As a carbonaceous material, for example, one or more of non-graphitizable carbon, graphitizable carbon, graphite, pyrolytic carbons, cokes, glassy carbons, an organic high molecular weight compound fired body, activated carbon, carbon black and the like can be used. Of the foregoing, cokes include pitch cokes, needle cokes, petroleum cokes and the like. The organic high molecular weight compound fired body is a carbonized body obtained by firing a high molecular weight compound such as a phenol resin and a furan resin at appropriate temperatures. The shape of these carbonaceous materials can be fibrous, spherical, granular, or scale-like.

The ratio of the carbonaceous material is preferably within the range from 1 wt % to 95 wt % to the anode active material of this embodiment. When the amount of the carbonaceous material is small, the conductivity of the anode 22 is decreased. Meanwhile, when the amount of the carbonaceous material is large, the battery capacity deteriorates.

The separator 23 separates the cathode 21 from the anode 22, prevents current short circuit due to contact of both electrodes, and lets through lithium ions. The separator 23 is made of, for example, a synthetic resin porous film composed of polytetrafluoroethylene, polypropylene, polyethylene or the like, or a ceramics porous film. The separator 23 can have a structure, in which two or more of the foregoing porous films are layered.

The electrolytic solution impregnated in the separator 23 contains a solvent and an electrolyte salt dissolved in the solvent.

As a solvent, a nonaqueous solvent such as ester carbonate can be cited. Nonaqueous solvents are divided into, for example, solvents with a high boiling point whose boiling point is more than 150 deg C. at the ambient pressure ($1.01325 \times 10^5$ Pa) and solvents with a low boiling point whose boiling point is 150 deg C. or less. A mixture thereof is preferable since high ion conductivity can be obtained. As a solvent with a high boiling point, for example, propylene carbonate, ethylene carbonate, or γ-butyrolactone can be cited. As a solvent with a low boiling point, for example, diethyl carbonate, dimethyl carbonate, or ethyl methyl carbonate can be cited. Any of these solvents may be used singly, or mixture of two or more thereof may be used.

As a solvent with a high boiling point, a cyclic ester carbonate derivative having halogen atoms can be also cited. Specially, the ethylene carbonate derivative expressed in Chemical formula 1 or the propylene carbonate derivative expressed in Chemical formula 2 are more preferably used, since decomposition reaction of the solvent in the anode 22 can be inhibited, and cycle characteristics can be improved.

Chemical formula 1

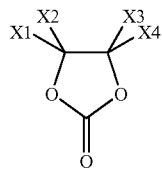

In the formula, X1, X2, X3, and X4 represent any of a hydrogen group, a fluorine group, a chlorine group, a bromine group, and an iodine group. X1, X2, X3, and X4 may be identical or different from each other, but at least one thereof is a fluorine group, a chlorine group, a bromine group, or an iodine group.

Chemical formula 2

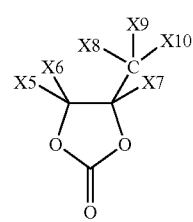

In the formula, X5, X6, X7, X8, X9, and X10 represent any of a hydrogen group, a fluorine group, a chlorine group, a bromine group, and an iodine group. X5, X6, X7, X8, X9, and X10 may be identical or different from each other, but at least one thereof is a fluorine group, a chlorine group, a bromine group, or an iodine group.

Specific examples of the cyclic ester carbonate derivative having halogen atoms as above include 4-fluoro-1,3-dioxolan-2-one expressed in Chemical formula 3, 4-difluoro-1,3-dioxolan-2-one expressed in Chemical formula 4, 4,5-difluoro-1,3-dioxolan-2-one expressed in Chemical formula 5, 4-difluoro-5-fluoro-1,3-dioxolan-2-one expressed in Chemical formula 6, 4-chrolo-1,3-dioxolan-2-one expressed in Chemical formula 7, 4,5-dichrolo-1,3-dioxolan-2-one expressed in Chemical formula 8, 4-bromo-1,3-dioxolan-2-one expressed in Chemical formula 9, 4-iodine-1,3-dioxolan-2-one expressed in Chemical formula 10, 4-fluoromethyl-1,3-dioxolan-2-one expressed in Chemical formula 11, and 4-trifluoromethyl-1,3-dioxolan-2-one expressed in Chemical formula 12. Specially, 4-fluoro-1,3-dioxolan-2-one is desirable, since higher effects can be obtained.

Chemical formula 3

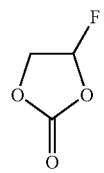

Chemical formula 4

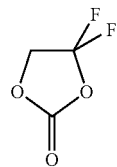

Chemical formula 5

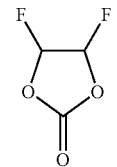

Chemical formula 6

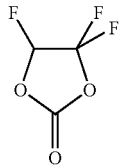

Chemical formula 7

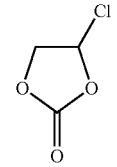

Chemical formula 8

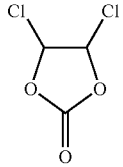

Chemical formula 9

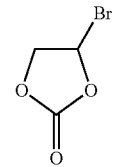

Chemical formula 10

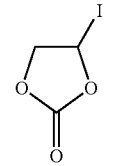

Chemical formula 11

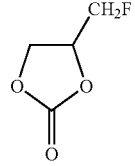

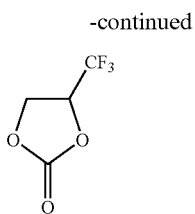

Chemical formula 12

The content of the cyclic ester carbonate derivative having halogen atoms is preferably in the range from 0.1 wt % to 80 wt % to the whole solvent. When the content is under this range, the effect to inhibit decomposition reaction of the solvent in the anode 22 is low. Meanwhile, when the content is over this range, the viscosity is increased and the ion conductivity deteriorates.

As a solvent, a cyclic ester carbonate of the unsaturated compound is preferably further contained, since decomposition reaction of the solvent can be inhibited. As a cyclic ester carbonate of the unsaturated compound, for example, 1,3-dioxole-2-one, 4-vinyl-1,3-dioxolan-2-one, or derivatives thereof can be cited.

The content of the cyclic ester carbonate of the unsaturated compound is preferably from 0.5 wt % to 10 wt % to the whole solvent. In this range, the effect to inhibit decomposition reaction of the solvent is high.

As an electrolyte salt, for example, lithium salts can be cited. One lithium salt may be used singly, or two or more thereof may be used by mixing. As a lithium salt, $LiClO_4$, $LiAsF_6$, $LiPF_6$, $LiBF_4$, $LiB(C_6H_5)_4$, $CH_3SO_3Li$, $CF_3SO_3Li$, LiCl, LiBr or the like can be cited. Though the lithium salt is preferably used as an electrolyte salt, it is not necessary to use the lithium salt. Lithium ions contributing to charge and discharge are enough if provided by the cathode 21 or the like.

The secondary battery can be manufactured as follows, for example.

First, for example, a cathode active material, and if necessary, a conductive agent and a binder are mixed to prepare a cathode mixture. The cathode mixture is dispersed in a mixed solvent such as N-methyl-2-pyrrolidone to form a cathode mixture slurry. Next, the cathode current collector 21A is coated with the cathode mixture slurry, which is dried and compressed to form the cathode active material layer 21B. Consequently, the cathode 21 is fabricated. Subsequently, the cathode lead 25 is welded to the cathode 21.

Further, for example, the anode active material according to this embodiment and if necessary, other anode active material and a binder are mixed to prepare an anode mixture. The anode mixture is dispersed in a mixed solvent such as N-methyl-2-pyrrolidone to form an anode mixture slurry. Next, the anode current collector 22A is coated with the anode mixture slurry, which is dried and compressed to form the anode active material layer 22B. Consequently, the anode 22 is fabricated. Subsequently, the anode lead 26 is welded to the anode 22.

After that, the cathode 21 and the anode 22 are wound with the separator 23 inbetween. An end of the cathode lead 25 is welded to the safety valve mechanism 15, and an end of the anode lead 26 is welded to the battery can 11. The wound cathode 21 and the wound anode 22 are sandwiched between the pair of insulating plates 12 and 13, and accommodated inside the battery can 11. Next, the electrolytic solution is injected inside the battery can 11. After that, at the open end of the battery can 11, the battery cover 14, the safety valve mechanism 15, and the PTC device 16 are fixed by being caulked through the gasket 17. The secondary battery shown in FIG. 1 is thereby completed.

In the secondary battery, when charged, for example, lithium ions are extracted from the cathode 21, and are inserted in the anode 22 through the electrolyte. When discharged, for example, lithium ions are extracted from the anode 22, and are inserted in the cathode 21 through the electrolyte. Here, the anode 22 contains the anode active material containing tin as the first element, the second element, and the third element, in which the content of the second element is from 9.8 wt % to 49 wt %. Therefore, while the high capacity is maintained, the structure with low crystallinity or the amorphous structure can be obtained, and cycle characteristics are improved.

As above, according to the secondary battery of this embodiment, since the anode active material contains tin as the first element. Therefore, the high capacity can be obtained. Further, the anode active material contains at least one from the group consisting of boron, carbon, aluminum, and phosphorus as the second element, and the content thereof is 9.8 wt % to 49 wt %. Therefore, the anode active material can have the structure with low crystallinity or the amorphous structure, and cycle characteristics can be improved. Further, the anode active material contains at least one from the group consisting of silicon, magnesium, titanium, vanadium, chromium, manganese, iron, cobalt, nickel, copper, zinc, gallium, zirconium, niobium, molybdenum, silver, indium, cerium, hafnium, tantalum, tungsten, and bismuth as a third element. Therefore, the capacity can be further increased, and cycle characteristics can be further improved.

Further, when the cyclic ester carbonate derivative having halogen atoms is contained in the electrolyte, decomposition reaction of the solvent in the anode 22 can be inhibited, and cycle characteristics can be further improved. Furthermore, when the cyclic ester carbonate of the unsaturated compound is contained in the electrolyte, cycle characteristics can be also further improved.

(Second Battery)

Figure 3:
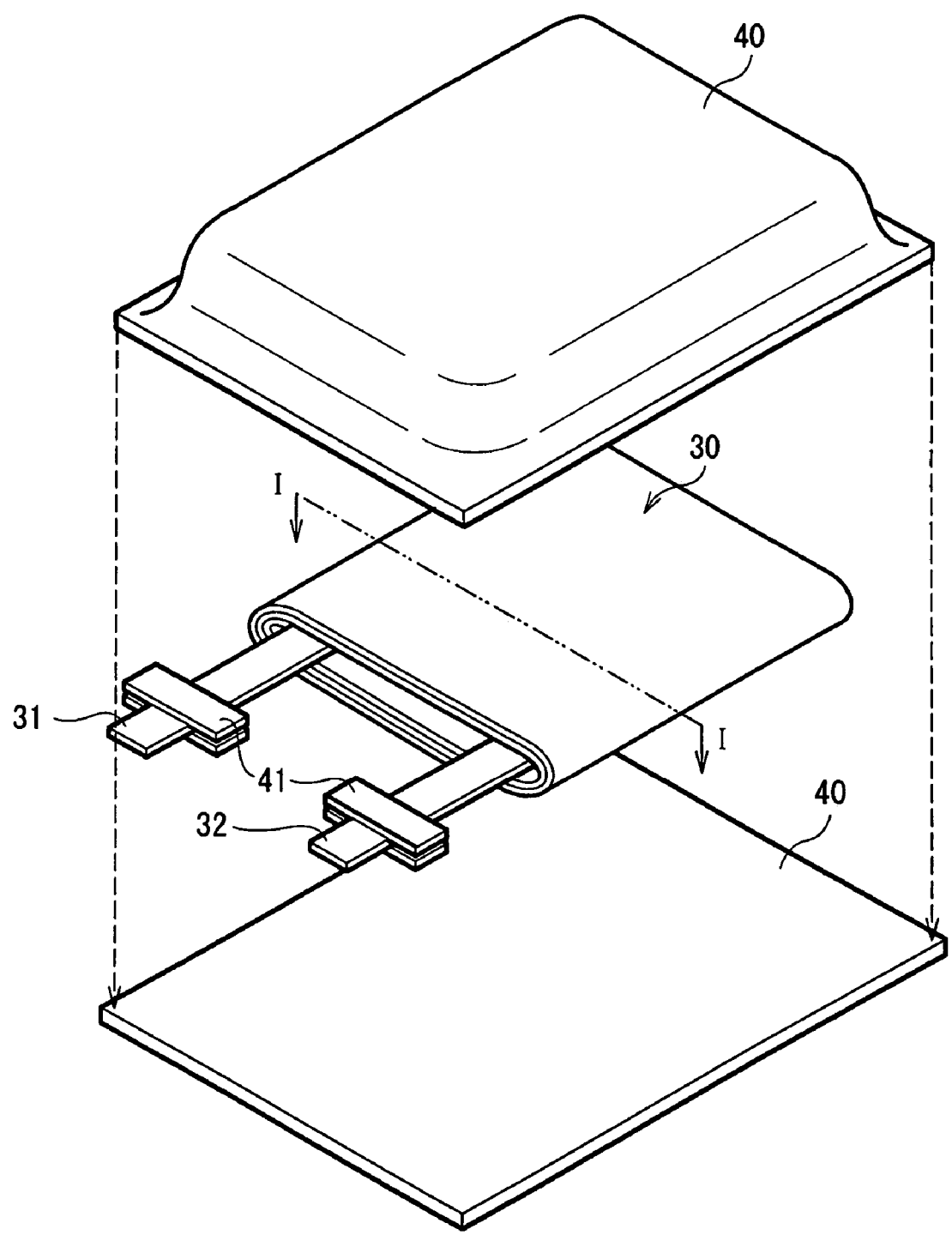
FIG. 3 is an exploded perspective view showing a construction of another secondary battery according to the embodiment of the present invention.

FIG. 3 shows a construction of a second secondary battery. In the secondary battery, a spirally wound electrode body 30 on which a cathode lead 31 and an anode lead 32 are attached is accommodated inside a film package member 40. The size, the weight, and the thickness of the secondary battery can be thereby reduced.

The cathode lead 31 and the anode lead 32 are directed from inside to outside of the package member 40, and, for example, are derived in the same direction, respectively. The cathode lead 31 and the anode lead 32 are respectively made of, for example, a metal material such as aluminum, copper, nickel, and stainless and are in a state of thin plate or mesh.

The package member 40 is made of a rectangular aluminum laminated film in which, for example, a nylon film, an aluminum foil, and a polyethylene film are bonded together in this order. The package member 40 is, for example, arranged so that the polyethylene film side and the spirally wound electrode body 30 are opposed, and the respective outer edges are contacted to each other by fusion bonding or an adhesive. Adhesive films 41 to protect from outside air intrusion are inserted between the package member 40 and the cathode lead 31, the anode lead 32. The adhesive film 41 is made of a material having contact characteristics to the cathode lead 31 and the anode lead 32 such as a polyolefin resin of polyethylene, polypropylene, modified polyethylene, modified polypropylene.

The package member 40 may be made of a laminated film having other structure, a high molecular weight film such as polypropylene, or a metal film, instead of the foregoing aluminum laminated film.

Figure 4:
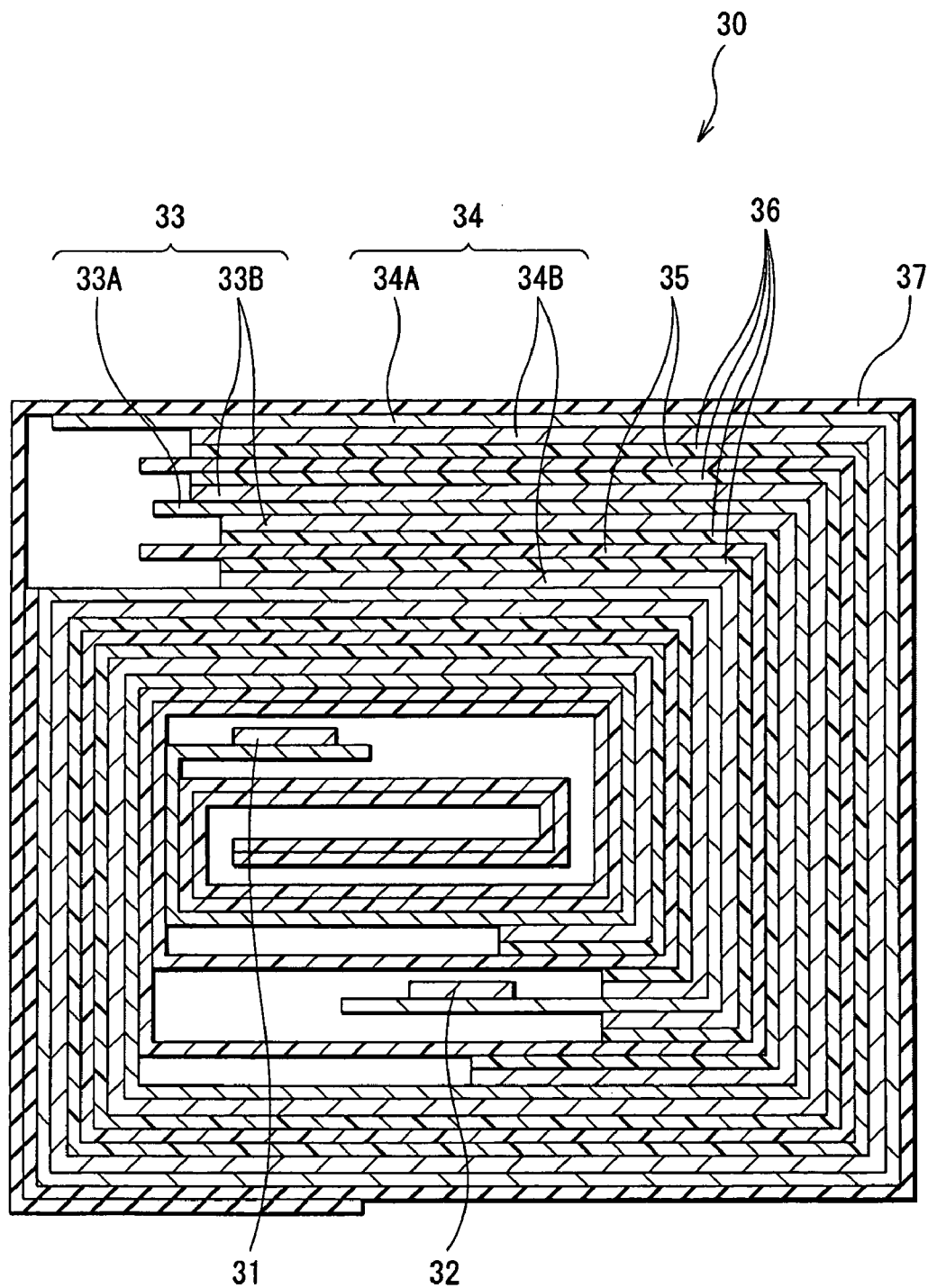
FIG. 4 is a cross section showing a construction taken along line I—I of a spirally wound electrode body shown in FIG. 3.

FIG. 4 shows a cross section structure taken along line I—I of the spirally wound electrode body 30 shown in FIG. 3. In the spirally wound electrode body 30, a cathode 33 and an anode 34 are layered with a separator 35 and an electrolyte layer 36 inbetween and wound. The outermost periphery thereof is protected by a protective tape 37.

The cathode 33 has a structure in which a cathode active material layer 33B is provided on a single face or both faces of a cathode current collector 33A. The anode 34 has a structure in which an anode active material layer 34B is provided on the single face or both faces of the anode current collector 34A. Arrangement is made so that the anode active material layer 34B is opposed to the cathode active material layer 33B. Constructions of the cathode current collector 33A, the cathode active material layer 33B, the anode current collector 34A, the anode active material layer 34B, and the separator 35 are similar to of the cathode current collector 21A, the cathode active material layer 21B, the anode current collector 22A, the anode active material layer 22B, and the separator 23 described above.

The electrolyte layer 36 is a so-called gelatinous electrolyte containing an electrolytic solution and a high molecular weight compound to become a holding body, which holds the electrolytic solution. The gelatinous electrolyte is preferable, since the high ion conductivity can be thereby obtained, and leak of the battery can be thereby prevented. The construction of the electrolytic solution (that is, a solvent, an electrolyte salt and the like) is similar to of the cylindrical secondary battery shown in FIG. 1. As a high molecular weight compound, for example, a fluorinated high molecular weight compound such as polyvinylidene fluoride and vinylidene fluoride-hexafluoro propylene copolymer, an ether high molecular weight compound such as polyethylene oxide and a cross-linked compound containing polyethylene oxide, or polyacrylonitrile can be cited. In particular, in view of redox stability, the fluorinated high molecular weight compound is desirable.

The secondary battery can be manufactured as follows, for example.

First, the cathode 33 and the anode 34 are respectively coated with a precursor solution containing a solvent, an electrolyte salt, a high molecular weight compound, and a mixed solvent. The mixed solvent is volatilized to form the electrolyte layer 36. After that, the cathode lead 31 is welded to the end of the cathode current collector 33A, and the anode lead 32 is welded to the end of the anode current collector 34A. Next, the cathode 33 and the anode 34 provided with the electrolyte layer 36 are layered with the separator 35 inbetween to obtain a lamination. The lamination is wound in the longitudinal direction, the protective tape 37 is adhered to the outermost periphery thereof to form the spirally wound electrode body 30. Lastly, for example, the spirally wound electrode body 30 is sandwiched between the package members 40, and outer edges of the package members 40 are contacted by thermal fusion-bonding or the like to enclose the spirally wound electrode body 30. Then, the adhesive films 41 are inserted between the cathode lead 31, the anode lead 32, and the package member 40. Thereby, the secondary battery shown in FIG. 3 and FIG. 4 is completed.

Further, the secondary battery may be manufactured as follows. First, as described above, the cathode 33 and the anode 34 are formed, and the cathode lead 31 and the anode lead 32 are attached on the cathode 33 and the anode 34. After that, the cathode 33 and the anode 34 are layered with the separator 35 inbetween and wound. The protective tape 37 is adhered to the outermost periphery thereof, and a spirally wound body, the precursor of the spirally wound electrode body 30, is formed. Next, the spirally wound body is sandwiched between the package members 40, the outermost peripheries except for one side are thermal fusion-bonded to obtain a pouched state, and the spirally wound body is accommodated inside the package member 40. Subsequently, a composition of matter for electrolyte containing a solvent, an electrolyte salt, a monomer as the raw material for the high molecular weight compound, a polymerization initiator, and if necessary other material such as a polymerization inhibitor is prepared and is injected inside the package member 40.

After the composition of matter for electrolyte is injected, the opening of the package member 40 is thermal fusion-bonded and hermetically sealed in the vacuum atmosphere. Next, the resultant is heated to polymerize the monomer to obtain a high molecular weight compound. Thereby, the gelatinous electrolyte layer 36 is formed, and the secondary battery shown in FIG. 3 is assembled.

The secondary battery works similar to the first secondary battery, and similar effects can be obtained.

(Third Battery)

Figure 5:
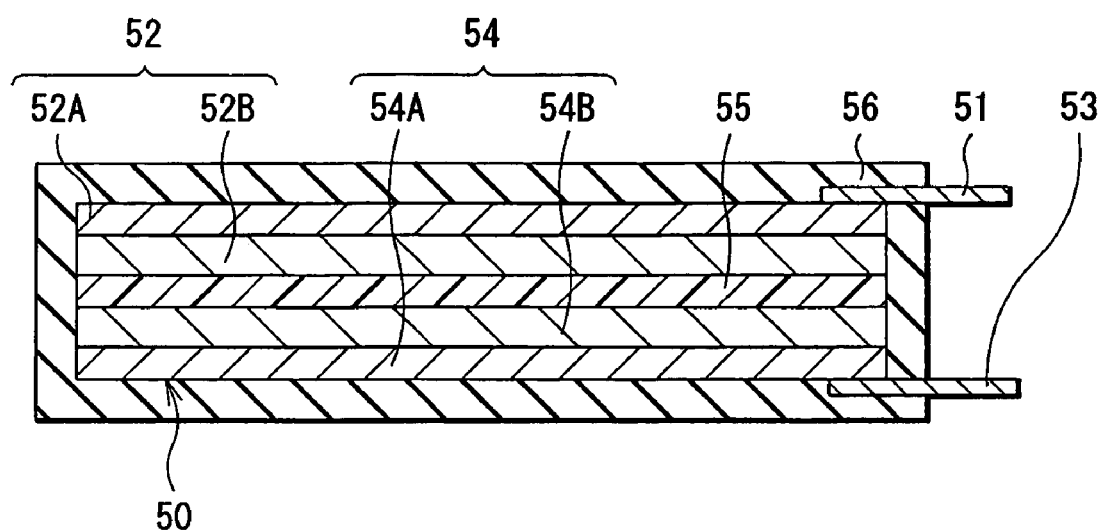
FIG. 5 is a cross section showing a construction of still another secondary battery according to the embodiment of the present invention.

FIG. 5 shows a cross section construction of a third secondary battery. In the secondary battery, a tabular electrode body 50 in which a cathode 52 attached with a cathode lead 51 and an anode 54 attached with an anode lead 53 are oppositely arranged with an electrolyte 55 inbetween is accommodated in a film package member 56. The construction of the package member 56 is similar to of the foregoing package member 40.

The cathode 52 has a structure in which a cathode active material layer 52B is provided on a cathode current collector 52A. The anode 54 has a structure in which an anode active material layer 54B is provided on an anode current collector 54A. Arrangement is made so that the anode active material layer 54B is opposed to the cathode active material layer 52B. Constructions of the cathode current collector 52A, the cathode active material layer 52B, the anode current collector 54A, and the anode active material layer 54B are similar to of the cathode current collector 21A, the cathode active material layer 21B, the anode current collector 22A, and the anode active material layer 22B described above.

The electrolyte layer 55 is made of, for example, a solid electrolyte. As a solid electrolyte, for example, either an inorganic solid electrolyte or a high molecular weight solid electrolyte can be used as long as the electrolyte is a material having lithium ion conductivity. As an inorganic solid electrolyte, the electrolyte containing lithium nitride, lithium iodide or the like can be cited. The high molecular weight solid electrolyte is the electrolyte mainly composed of an electrolyte salt and a high molecular weight compound dissolving the electrolyte salt. As a high molecular weight compound, for example, an ether high molecular weight compound such as polyethylene oxide and a cross-linked compound containing polyethylene oxide, an ester high molecular weight compound such as polymethacrylate, or an acrylate high molecular weight compound can be used singly, by mixing, or copolymerization thereof.

The high molecular weight solid electrolyte can be formed by, for example, mixing a high molecular weight compound, an electrolyte salt, and a mixed solvent, and then volatilizing the mixed solvent. Otherwise, the high molecular weight solid electrolyte can be formed by dissolving an electrolyte salt, a monomer as the raw material for the high molecular weight compound, a copolymerization initiator, and if necessary other material such as a polymerization inhibitor into a mixed solvent, volatilizing the mixed solvent, and then heating to polymerize the monomer to obtain a high molecular weight compound.

The inorganic solid electrolyte can be formed, for example, on the surface of the cathode 52 or the anode 54 by, for example, a vapor-phase deposition method such as sputtering method, vacuum deposition method, laser ablation method, ion plating method, and CVD (Chemical Vapor Deposition) method; or a liquid-phase deposition method such as sol-gel method.

The secondary battery works and provides effects similar to the first or the second secondary battery.

EXAMPLES

Further, specific examples of the present invention will be described in detail.

Examples 1-1 to 1-8

First, an anode active material was formed. Sn—Co alloy powders and carbon powders as raw materials were mixed at a given ratio to obtain 10 g of the entire input powder amount, which was dry-blended. The mixture together with about 400 g of steel ball being 9 mm in diameter was set into a reaction vessel of a planetary ball mill of ITO Seisakusho Co., Ltd. Inside of the reaction vessel was substituted with argon atmosphere, ten-minute operation at a rotational speed of 250 rpm and 10-minute break were repeated until the total operation time became 20 hours. After that, the reaction vessel was cooled down to room temperatures, and the synthesized anode active material powders were taken out, from which coarse grains were removed through a 200-mesh sieve. The obtained anode active material powders were provided with composition analysis. The carbon content was measured by a carbon-sulfur analyzer, and the contents of tin and cobalt were measured by ICP (Inductively Coupled Plasma) emission spectrometry. Further, the half bandwidth of the diffraction peak of the reaction phase was measured by X-ray diffraction. The analytical values are shown in Table 1.

TABLE 1

| | Composition (wt %) | | | Half bandwidth (°) | Capacity retention ratio (%) |
|---|---|---|---|---|---|
| | Sn | Co | C | | |
| Example 1-1 | 30.6 | 18.4 | 49 | 5 | 45 |
| Example 1-2 | 36.8 | 22 | 39.2 | 5 | 50 |
| Example 1-3 | 42.9 | 25.7 | 29.4 | 5 | 59 |
| Example 1-4 | 45.9 | 27.6 | 24.5 | 5 | 60 |
| Example 1-5 | 49 | 29.4 | 19.6 | 5 | 60 |
| Example 1-6 | 52.1 | 31.2 | 14.7 | 5 | 57 |
| Example 1-7 | 53.9 | 32.3 | 11.8 | 5 | 55 |
| Example 1-8 | 55.1 | 33.1 | 9.8 | 5 | 54 |
| Comparative example 1-1 | 56.4 | 33.8 | 7.8 | 5 | 34 |
| Comparative example 1-2 | 58.2 | 34.9 | 4.9 | 5 | 25 |
| Comparative example 1-3 | 60.6 | 36.4 | 1 | 5 | 15 |
| Comparative example 1-4 | 61.3 | 36.7 | 0 | 5 | 2 |
| Comparative example 1-5 | 27.6 | 16.5 | 53.9 | 5 | 40 |

Solvent: ethylene carbonate + dimethyl carbonate

Next, the cylindrical secondary battery shown in FIG. 1 was fabricated. First, lithium carbonate ($Li_2CO_3$) and cobalt carbonate ($CoCO_3$) were mixed at a mole ratio of $Li_2CO_3$:$CoCO_3$=0.5:1. The mixture was fired for 5 hours at 890 deg C. in the air to obtain a lithium cobalt complex oxide ($LiCoO_2$). Regarding the obtained $LiCoO_2$, X-ray diffraction was performed. The result thereof well corresponded with the peak of $LiCoO_2$ registered in JCPDS (Joint Committee of Powder Diffraction Standard) file. Subsequently, the lithium cobalt complex oxide was pulverized to obtain powders having an average particle diameter of 10 µm, which was obtained as a cathode active material.

Next, 95 parts by mass of $LiCoO_2$ and 5 parts by mass of $Li_2CO_3$ powders were mixed. 91 parts by mass of the mixture, 6 parts by mass of graphite (KS-15 of Lonza), as a conductive agent, and 3 parts by mass of polyvinylidene fluoride as a binder were mixed. The mixture was dispersed in N-methyl-2-pyrrolidone as the solvent to obtain a cathode mixture slurry. After that, both faces of the cathode current collector 21A made of a strip-shaped aluminum foil being 20 µm thick were uniformly coated with the cathode mixture slurry, which was then dried. The resultant was compression-molded to form the cathode active material layer 21B and fabricate the cathode 21. After that, the cathode lead 25 made of aluminum was attached to the end of the cathode current collector 21A.

Further, 80 parts by mass of the foregoing anode active material powders, 11 parts by mass of graphite (KS-15 of Lonza) and 1 part by mass of acetylene black as a conductive agent, and 8 parts by mass of polyvinylidene fluoride as a binder were mixed. The mixture was dispersed in N-methyl-2-pyrrolidone as the solvent to obtain an anode mixture slurry. After that, both faces of the anode current collector 22A made of a strip-shaped copper foil being 10 µm thick were uniformly coated with the anode mixture slurry, which was then dried. The resultant was compression-molded at a constant pressure to form the anode active material layer 22B and fabricate the anode 22. Subsequently, the anode lead 26 made of nickel was attached to the end of the anode current collector 22A.

After the cathode 21 and the anode 22 were respectively fabricated, the three-layer structure separator 23 made of polypropylene-polyethylene-polypropylene being 25 µm thick (UP3015 of Ube Industries, Ltd.) was prepared. The anode 22, the separator 23, the cathode 21, and the separator 23 were layered in this order to obtain a lamination. The lamination was spirally wound several times. The wound-up portion was fixed by using an adhesive tape to fabricate the spirally wound electrode body 20.

After the spirally wound electrode body 20 was fabricated, the spirally wound electrode body 20 was sandwiched between the pair of insulating plates 12 and 13, the anode lead 26 was welded to the battery can 11, the cathode lead 25 was welded to the safety valve mechanism 15, and the spirally wound electrode body 20 was accommodated in the battery can 11 made of nickel-plated iron. After that, an electrolytic solution was injected in the battery can 11 by reduced-pressure injection method, and the battery cover 14 was caulked to the battery can 11 through the gasket 17 whose surface is coated with asphalt. In the result, the cylindrical secondary battery being 18 mm in diameter and 65 mm high was fabricated. As an electrolytic solution, the electrolytic solution obtained by dissolving $LiPF_6$ as an electrolyte salt into the mixed solvent of ethylene carbonate and dimethyl carbonate at a mass ratio of ethylene carbonate:dimethyl carbonate=40:60 so that the amount of $LiPF_6$ became 1 mol/l was used.

As Comparative examples 1-1 to 1-5 relative to Examples 1-1 to 1-8, secondary batteries were fabricated as in Examples 1-1 to 1-8, except that the anode active material was synthesized by mixing Sn—Co alloy powders and carbon powders as raw materials at a given ratio, or except that Sn—Co alloy powders were used as an anode active material. Regarding the anode active material powders, the contents of carbon, tin, and cobalt and the half bandwidth of the diffraction peak of the reaction phase were measured. The analytical values are shown in Table 1 together.

Regarding the obtained secondary batteries of Examples 1-1 to 1-8 and Comparative examples 1-1 to 1-5, cycle characteristics were measured. The results are shown in Table 1. The cycle characteristics were measured as follows.

First, after constant current-constant voltage charge at 2500 mA was performed in the environment of 25 deg C. to the upper limit voltage of 4.2 V, constant current discharge at 2000 mA was performed to the final voltage of 2.6 V. 150 cycles of charge and discharge were performed under the same charge and discharge conditions, and the discharge capacity retention ratio (%) at the 150th cycle was obtained where the discharge capacity at the first cycle was 100.

As evidenced by Table 1, the capacity retention ratio was increased as the carbon content in the anode active material was increased, showed the maximum value, and then was decreased. That is, it was found that when the carbon content in the anode active material was from 9.8 wt % to 49 wt %, cycle characteristics could be improved.

Examples 2-1 to 2-8

Secondary batteries were fabricated as in examples 1-1 to 1-8, except that a solvent obtained by mixing 4-fluoro-1,3-dioxolan-2-one expressed in Chemical formula 3, ethylene carbonate, and dimethyl carbonate at a mass ratio of 4-fluoro-1,3-dioxolan-2-one:ethylene carbonate:dimethyl carbonate=20:20:60 was used.

As Comparative examples 2-1 to 2-5 relative to Examples 2-1 to 2-8, secondary batteries were fabricated as in Examples 2-1 to 2-8, except that the anode active material powders were synthesized by mixing Sn—Co alloy powders and carbon powders as raw materials at a ratio similar to of Comparative examples 1-1 to 1-3 and 1-5, or except that Sn—Co alloy powders similar to of Comparative example 1-4 were used as an anode active material.

Figure 6:
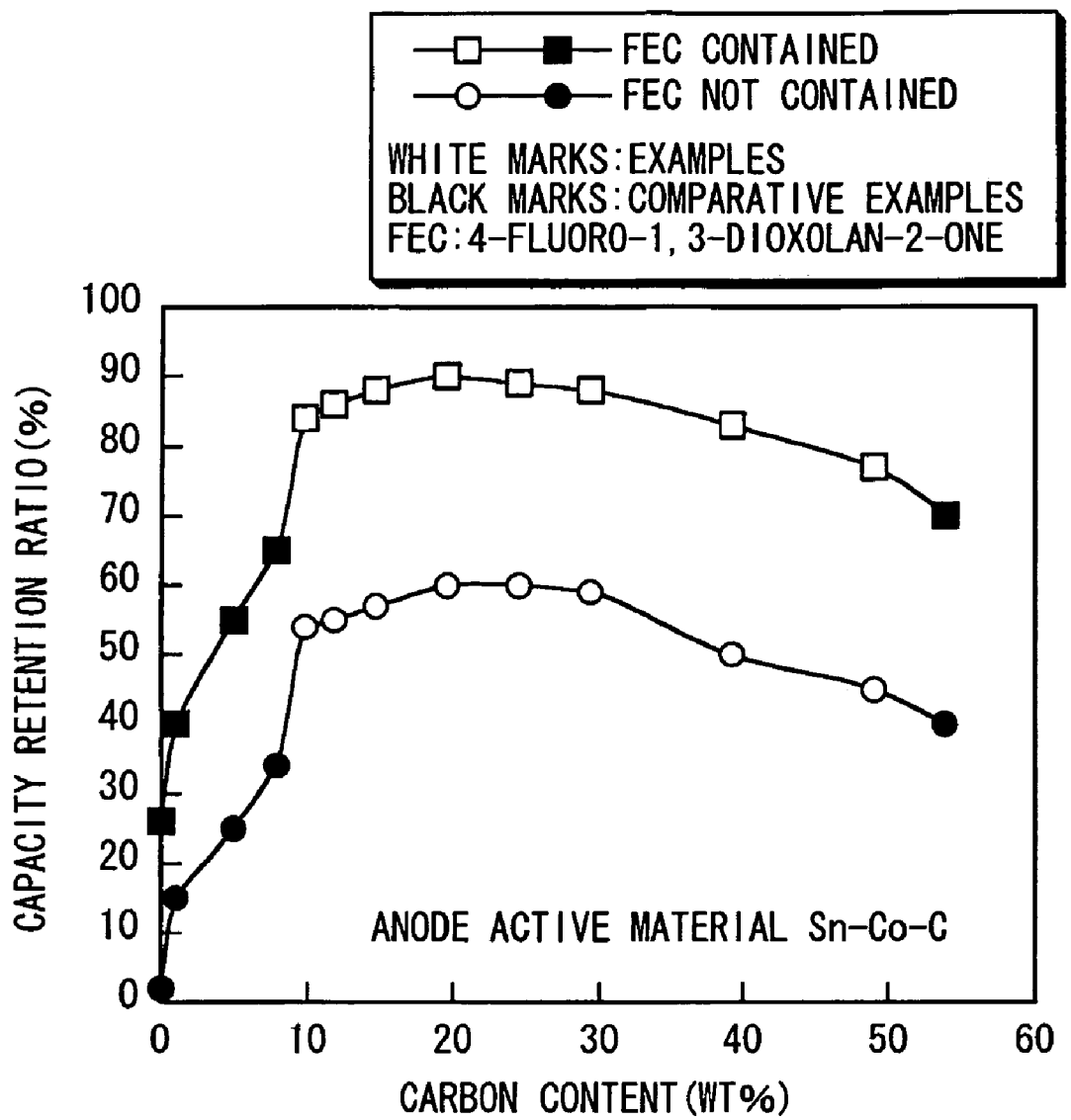
FIG. 6 is a characteristics view showing a relation between contents of carbon in an anode active material and capacity retention ratios.

Regarding the obtained secondary batteries of Examples 2-1 to 2-8 and Comparative examples 2-1 to 2-5, cycle characteristics were measured as in Examples 1-1 to 1-8. The results are shown in Table 2 and FIG. 6. In FIG. 6, the results are shown together with the results of Examples 1-1 to 1-8 and Comparative examples 1-1 to 1-5.

TABLE 2

| | Composition (wt %) | | | Half bandwidth (°) | Capacity retention ratio (%) |
|---|---|---|---|---|---|
| | Sn | Co | C | | |
| Example 2-1 | 30.6 | 18.4 | 49 | 5 | 77 |
| Example 2-2 | 36.8 | 22 | 39.2 | 5 | 83 |
| Example 2-3 | 42.9 | 25.7 | 29.4 | 5 | 88 |
| Example 2-4 | 45.9 | 27.6 | 24.5 | 5 | 89 |
| Example 2-5 | 49 | 29.4 | 19.6 | 5 | 90 |
| Example 2-6 | 52.1 | 31.2 | 14.7 | 5 | 88 |
| Example 2-7 | 53.9 | 32.3 | 11.8 | 5 | 86 |
| Example 2-8 | 55.1 | 33.1 | 9.8 | 5 | 84 |
| Comparative example 2-1 | 56.4 | 33.8 | 7.8 | 5 | 65 |
| Comparative example 2-2 | 58.2 | 34.9 | 4.9 | 5 | 55 |
| Comparative example 2-3 | 60.6 | 36.4 | 1 | 5 | 40 |
| Comparative example 2-4 | 61.3 | 36.7 | 0 | 5 | 26 |
| Comparative example 2-5 | 27.6 | 16.5 | 53.9 | 5 | 70 |

Solvent: 4-fluoro-1,3-dioxolan-2-one + ethylene carbonate + dimethyl carbonate

As evidenced by Table 2 and FIG. 6, the results similar to of Examples 1-1 to 1-8 were obtained. Further, according to Examples 2-1 to 2-8 using the electrolytic solution containing 4-fluoro-1,3-dioxolan-2-one expressed in Chemical formula 3, the capacity retention ratio was significantly improved than Examples 1-1 to 1-8 using the electrolytic solution not containing 4-fluoro-1,3-dioxolan-2-one. That is, it was found that when the electrolytic solution contained 4-fluoro-1,3-dioxolan-2-one, cycle characteristics could be further improved.

Examples 3-1 to 3-6

Secondary batteries were fabricated as in Examples 1-1 to 1-8, except that the anode active material powders were synthesized by mixing Sn—Fe alloy powders and carbon powders as raw materials at a given ratio. Then, the anode active material powders were provided with composition analysis. The carbon content was measured by a carbon-sulfur analyzer, and the contents of tin and iron were measured by ICP emission spectrometry. Further, the half bandwidth of the diffraction peak of the reaction phase was measured by X-ray diffraction. The analytical values are shown in Table 3.

TABLE 3

| | Composition (wt %) | | | Half bandwidth (°) | Capacity retention ratio (%) |
|---|---|---|---|---|---|
| | Sn | Fe | C | | |
| Example 3-1 | 30.6 | 18.4 | 49 | 5 | 40 |
| Example 3-2 | 36.8 | 22 | 39.2 | 5 | 45 |
| Example 3-3 | 42.9 | 25.7 | 29.4 | 5 | 48 |
| Example 3-4 | 49 | 29.4 | 19.6 | 5 | 50 |
| Example 3-5 | 52.1 | 31.2 | 14.7 | 5 | 44 |
| Example 3-6 | 55.1 | 33.1 | 9.8 | 5 | 40 |
| Comparative example 3-1 | 56.4 | 33.8 | 7.8 | 5 | 35 |
| Comparative example 3-2 | 61.3 | 36.7 | 0 | 5 | 1 |
| Comparative example 3-3 | 27.6 | 16.5 | 53.9 | 5 | 34 |

Solvent: ethylene carbonate + dimethyl carbonate

As Comparative examples 3-1 to 3-3 relative to Examples 3-1 to 3-6, secondary batteries were fabricated as in Examples 3-1 to 3-6, except that the anode active material powders were synthesized by mixing Sn—Fe alloy powders and carbon powders as raw materials at a given ratio, or except that Sn—Fe alloy powders were used as an anode active material. Then, the contents of carbon, iron, and cobalt in the anode active material powders, and the half bandwidth of the diffraction peak of the reaction phase were measured as in Examples 3-1 to 3-6. The analytical values are shown in Table 3 together.

Regarding the obtained secondary batteries of Examples 3-1 to 3-6 and Comparative examples 3-1 to 3-3, cycle characteristics were measured as in Examples 1-1 to 1-8. The results are shown in Table 3.

As evidenced by Table 3, the results similar to of Examples 1-1 to 1-8 were obtained. That is, it was found that when the carbon content in the anode active material was from 9.8 wt % to 49 wt %, cycle characteristics could be improved even if iron was contained.

Examples 4-1 to 4-6

Secondary batteries were fabricated as in Examples 3-1 to 3-6, except that a solvent obtained by mixing 4-fluoro-1,3-dioxolan-2-one expressed in Chemical formula 3, ethylene carbonate, and dimethyl carbonate at a mass ratio of 4-fluoro-1,3-dioxolan-2-one:ethylene carbonate:dimethyl carbonate=20:20:60 was used.

As Comparative examples 4-1 to 4-3 relative to Examples 4-1 to 4-6, secondary batteries were fabricated as in Examples 4-1 to 4-6, except that the anode active material powders were synthesized by mixing Sn—Fe alloy powders and carbon powders as raw materials at a ratio similar to of Comparative examples 3-1 and 3-3, or except that Sn—Fe alloy powders similar to of Comparative example 3-2 were used as an anode active material.

Figure 7:
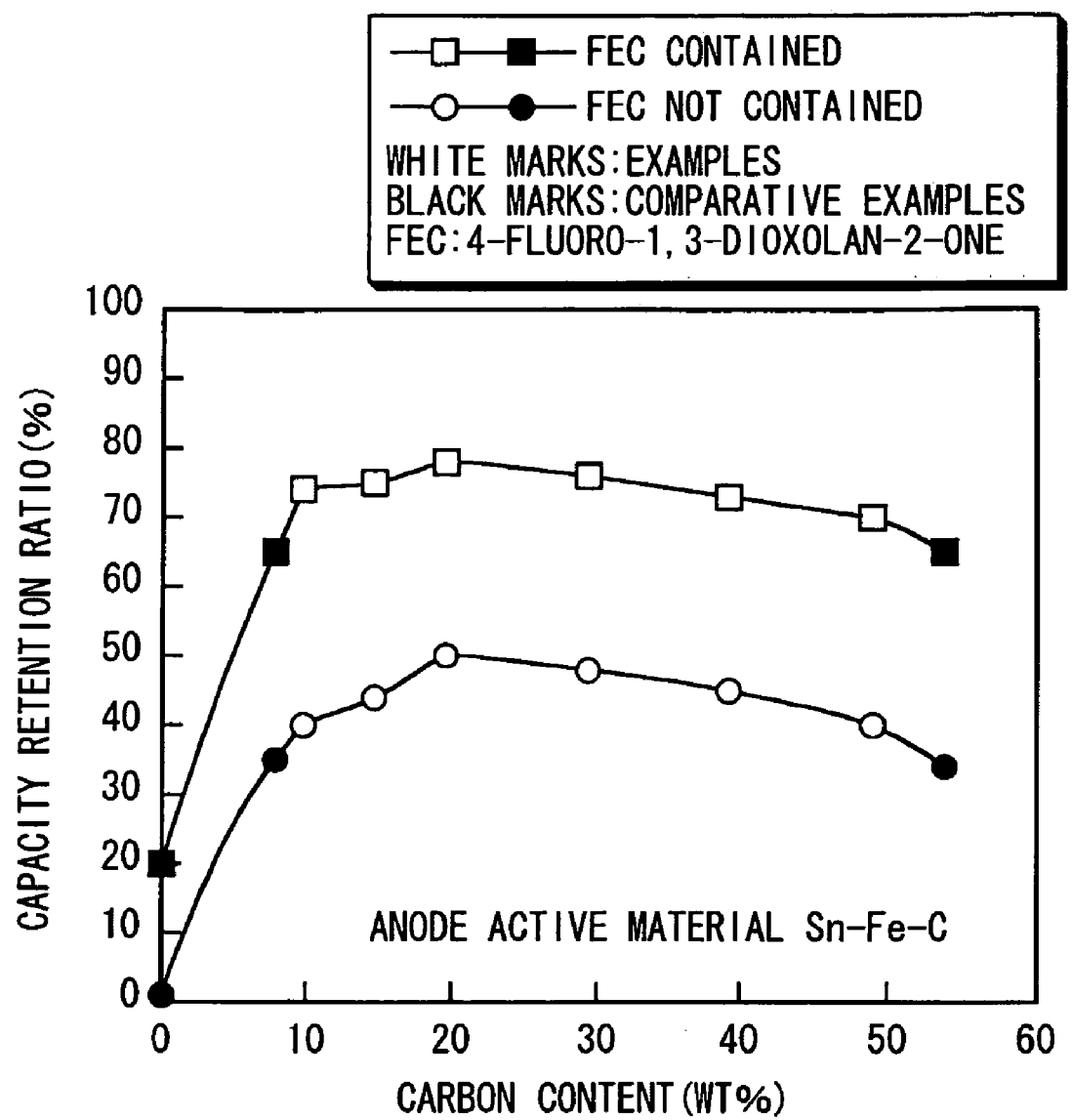
FIG. 7 is a characteristics view showing a relation between contents of carbon in another anode active material and capacity retention ratios.

Regarding the obtained secondary batteries of Examples 4-1 to 4-6 and Comparative examples 4-1 to 4-3, cycle characteristics were measured as in Examples 1-1 to 1-8. The results are shown in Table 4 and FIG. 7. In FIG. 7, the results are shown together with the results of Examples 3-1 to 3-6 and Comparative examples 3-1 to 3-3.

TABLE 4

| | Composition (wt %) | | | Half bandwidth | Capacity retention ratio |
|---|---|---|---|---|---|
| | Sn | Fe | C | (°) | (%) |
| Example 4-1 | 30.6 | 18.4 | 49 | 5 | 70 |
| Example 4-2 | 36.8 | 22 | 39.2 | 5 | 73 |
| Example 4-3 | 42.9 | 25.7 | 29.4 | 5 | 76 |
| Example 4-4 | 49 | 29.4 | 19.6 | 5 | 78 |
| Example 4-5 | 52.1 | 31.2 | 14.7 | 5 | 75 |
| Example 4-6 | 55.1 | 33.1 | 9.8 | 5 | 74 |
| Comparative example 4-1 | 56.4 | 33.8 | 7.8 | 5 | 65 |
| Comparative example 4-2 | 61.3 | 36.7 | 0 | 5 | 20 |
| Comparative example 4-3 | 27.6 | 16.5 | 53.9 | 5 | 65 |

Solvent: 4-fluoro-1,3-dioxolan-2-one + ethylene carbonate + dimethyl carbonate

As evidenced by Table 4 and FIG. 7, the results similar to of Examples 3-1 to 3-6 were obtained. Further, according to Examples 4-1 to 4-6 using the electrolytic solution containing 4-fluoro-1,3-dioxolan-2-one expressed in Chemical formula 3, the capacity retention ratio was significantly improved than in Examples 3-1 to 3-6 using the electrolytic solution not containing 4-fluoro-1,3-dioxolan-2-one. That is, it was found that when the electrolytic solution contained 4-fluoro-1,3-dioxolan-2-one, cycle characteristics could be further improved.

Examples 5-1 to 5-6

Secondary batteries were fabricated as in Examples 1-1 to 1-8, except that the anode active material powders were synthesized by mixing Sn—Co alloy powders and boron powders as raw materials at a given ratio. Then, the anode active material powders were provided with composition analysis. The contents of tin, cobalt, and boron were measured by ICP emission spectrometry. Further, the half bandwidth of the diffraction peak of the reaction phase was measured by X-ray diffraction. The analytical values are shown in Table 5.

TABLE 5

| | Composition (wt %) | | | Half bandwidth | Capacity retention ratio |
|---|---|---|---|---|---|
| | Sn | Co | B | (°) | (%) |
| Example 5-1 | 30.6 | 18.4 | 49 | 5 | 30 |
| Example 5-2 | 36.8 | 22 | 39.2 | 5 | 35 |
| Example 5-3 | 42.9 | 25.7 | 29.4 | 5 | 42 |
| Example 5-4 | 49 | 29.4 | 19.6 | 5 | 40 |
| Example 5-5 | 52.1 | 31.2 | 14.7 | 5 | 35 |
| Example 5-6 | 55.1 | 33.1 | 9.8 | 5 | 31 |
| Comparative example 5-1 | 56.4 | 33.8 | 7.8 | 5 | 26 |
| Comparative example 5-2 | 27.6 | 16.5 | 53.9 | 5 | 25 |
| Comparative example 1-4 | 61.3 | 36.7 | 0 | 5 | 2 |

Solvent: ethylene carbonate + dimethyl carbonate

As Comparative examples 5-1 and 5-2 relative to Examples 5-1 to 5-6, secondary batteries were fabricated as in Examples 5-1 to 5-6, except that the anode active material powders were synthesized by mixing Sn—Co alloy powders and boron powders as raw materials at a given ratio. Then, the contents of boron, tin, and cobalt in the anode active material and the half bandwidth of the diffraction peak of the reaction phase were measured as in Examples 5-1 to 5-6. The analytical values are shown in Table 5 together.

Regarding the obtained secondary batteries of Examples 5-1 to 5-6 and Comparative examples 5-1 and 5-2, cycle characteristics were measured as in Examples 1-1 to 1-8. The results are shown in Table 5 together with the results of Comparative example 1-4.

As evidenced by Table 5, the results similar to of Examples 1-1 to 1-8 were obtained. That is, it was found that when the boron content in the anode active material was from 9.8 wt % to 49 wt %, cycle characteristics could be also improved.

Examples 6-1 to 6-6

Secondary batteries were fabricated as in examples 5-1 to 5-6, except that a solvent obtained by mixing 4-fluoro-1,3-dioxolan-2-one expressed in Chemical formula 3, ethylene carbonate, and dimethyl carbonate at a mass ratio of 4-fluoro-1,3-dioxolan-2-one:ethylene carbonate:dimethyl carbonate=20:20:60 was used.

As Comparative examples 6-1 and 6-2 relative to Examples 6-1 to 6-6, secondary batteries were fabricated as in Examples 6-1 to 6-6, except that the anode active material powders were synthesized by mixing Sn—Co alloy powders and boron powders as raw materials at a ratio similar to of Comparative examples 5-1 and 5-2.

Figure 8:
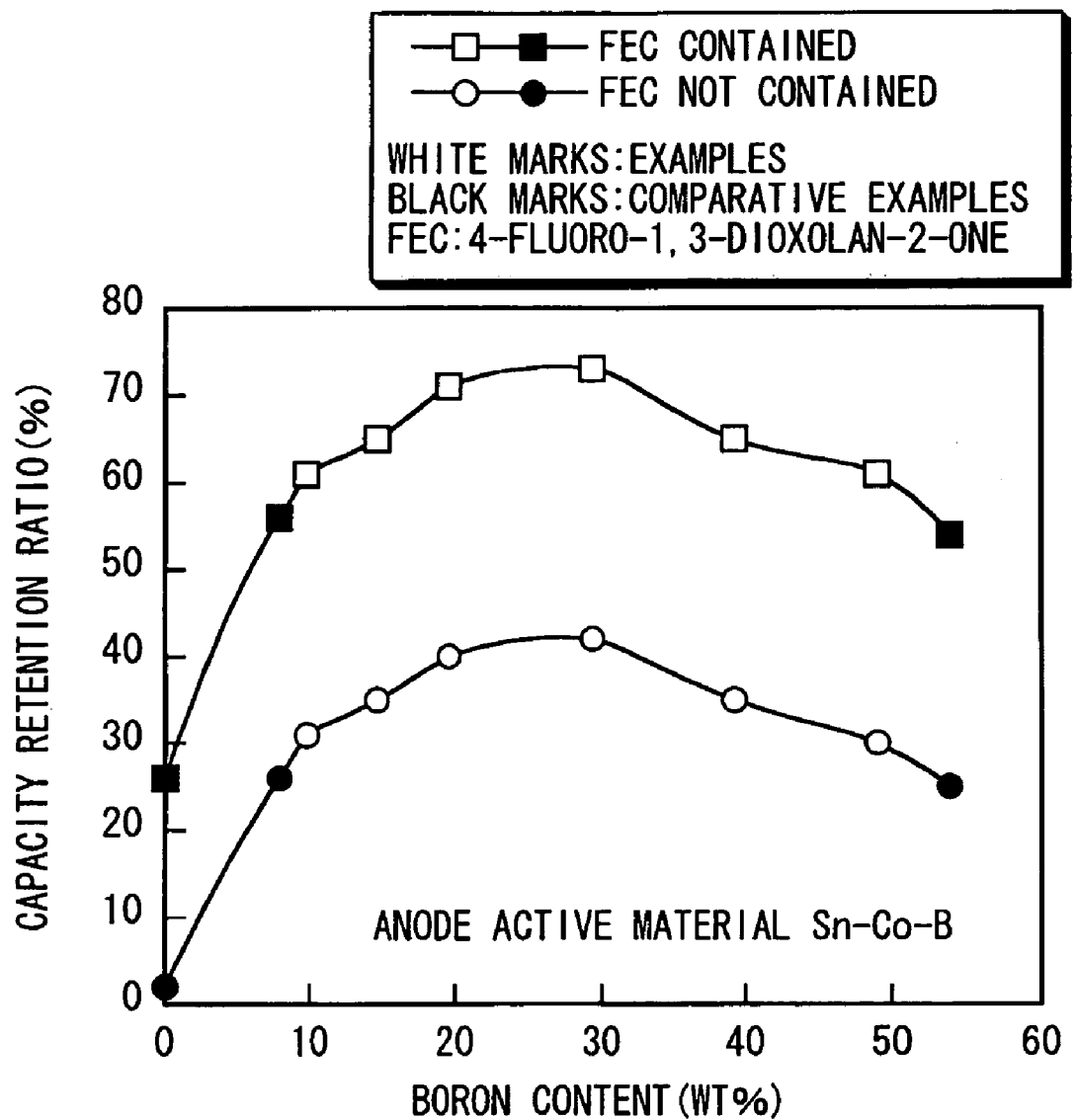
FIG. 8 is a characteristics view showing a relation between contents of boron in an anode active material and capacity retention ratios.

Regarding the obtained secondary batteries of Examples 6-1 to 6-6 and Comparative examples 6-1 and 6-2, cycle characteristics were measured as in Examples 1-1 to 1-8. The results are shown in Table 6 and FIG. 8 together with the results of Comparative example 2-4. In FIG. 8, the results are shown together with the results of Examples 5-1 to 5-6 and Comparative examples 1-4, 5-1, and 5-2.

TABLE 6

| | Composition (wt %) | | | Half bandwidth (°) | Capacity retention ratio (%) |
|---|---|---|---|---|---|
| | Sn | Co | B | | |
| Example 6-1 | 30.6 | 18.4 | 49 | 5 | 61 |
| Example 6-2 | 36.8 | 22 | 39.2 | 5 | 65 |
| Example 6-3 | 42.9 | 25.7 | 29.4 | 5 | 73 |
| Example 6-4 | 49 | 29.4 | 19.6 | 5 | 71 |
| Example 6-5 | 52.1 | 31.2 | 14.7 | 5 | 65 |
| Example 6-6 | 55.1 | 33.1 | 9.8 | 5 | 61 |
| Comparative example 6-1 | 56.4 | 33.8 | 7.8 | 5 | 56 |
| Comparative example 6-2 | 27.6 | 16.5 | 53.9 | 5 | 54 |
| Comparative example 2-4 | 61.3 | 36.7 | 0 | 5 | 26 |

Solvent: 4-fluoro-1,3-dioxolan-2-one + ethylene carbonate + dimethyl carbonate

As evidenced by Table 6 and FIG. 8, the results similar to of Examples 5-1 to 5-6 were obtained. Further, according to Examples 6-1 to 6-6 using the electrolytic solution containing 4-fluoro-1,3-dioxolan-2-one expressed in Chemical formula 3, the capacity retention ratio was significantly improved than in Examples 5-1 to 5-6 using the electrolytic solution not containing 4-fluoro-1,3-dioxolan-2-one. That is, it was found that when the electrolytic solution contained 4-fluoro-1,3-dioxolan-2-one, cycle characteristics could be further improved.

Examples 7-1 to 7-6

Secondary batteries were fabricated as in Examples 1-1 to 1-8, except that the anode active material powders were synthesized by mixing Sn—Co alloy powders and aluminum powders as raw materials at a given ratio. Then, the anode active material powders were provided with composition analysis. The contents of tin, cobalt, and aluminum were measured by ICP emission spectrometry. Further, the half bandwidth of the diffraction peak of the reaction phase was measured by X-ray diffraction. The analytical values are shown in Table 7.

TABLE 7

| | Composition (wt %) | | | Half bandwidth (°) | Capacity retention ratio (%) |
|---|---|---|---|---|---|
| | Sn | Co | Al | | |
| Example 7-1 | 30.6 | 18.4 | 49 | 5 | 30 |
| Example 7-2 | 42.9 | 25.7 | 29.4 | 5 | 35 |
| Example 7-3 | 45.9 | 27.6 | 24.5 | 5 | 40 |
| Example 7-4 | 49 | 29.4 | 19.6 | 5 | 42 |
| Example 7-5 | 52.1 | 31.2 | 14.7 | 5 | 40 |
| Example 7-6 | 55.1 | 33.1 | 9.8 | 5 | 30 |

TABLE 7-continued

| | Composition (wt %) | | | Half bandwidth (°) | Capacity retention ratio (%) |
|---|---|---|---|---|---|
| | Sn | Co | Al | | |
| Comparative example 7-1 | 58.2 | 34.9 | 4.9 | 5 | 20 |
| Comparative example 7-2 | 60 | 36 | 2 | 5 | 10 |
| Comparative example 7-3 | 60.6 | 36.4 | 1 | 5 | 5 |
| Comparative example 1-4 | 61.3 | 36.7 | 0 | 5 | 2 |

Solvent: ethylene carbonate + dimethyl carbonate

As Comparative example 7-1 to 7-3 relative to Examples 7-1 to 7-6, secondary batteries were fabricated as in Examples 7-1 to 7-6, except that the anode active material powders were synthesized by mixing Sn—Co alloy powders and aluminum powders as raw materials at a given ratio. Then, the contents of aluminum, tin, and cobalt in the anode active material powders and the half bandwidth of the diffraction peak of the reaction phase were measured as in Examples 7-1 to 7-6. The analytical values are shown in Table 7 together.

Regarding the obtained secondary batteries of Examples 7-1 to 7-6 and Comparative examples 7-1 to 7-3, cycle characteristics were measured as in Examples 1-1 to 1-8. The results are shown in Table 7 together with the results of Comparative example 1-4.

As evidenced by Table 7, the results similar to of Examples 1-1 to 1-8 were obtained. That is, it was found that when the aluminum content in the anode active material was from 9.8 wt % to 49 wt %, cycle characteristics could be also improved.

Examples 8-1 to 8-6

Secondary batteries were fabricated as in Examples 7-1 to 7-6, except that a solvent obtained by mixing 4-fluoro-1,3-dioxolan-2-one expressed in Chemical formula 3, ethylene carbonate, and dimethyl carbonate at a mass ratio of 4-fluoro-1,3-dioxolan-2-one:ethylene carbonate:dimethyl carbonate=20:20:60 was used.

As Comparative examples 8-1 to 8-3 relative to Examples 8-1 to 8-6, secondary batteries were fabricated as in Examples 8-1 to 8-6, except that the anode active material powders were synthesized by mixing Sn—Co alloy powders and aluminum powders as raw materials at a ratio similar to of Comparative examples 7-1 to 7-3.

Figure 9:
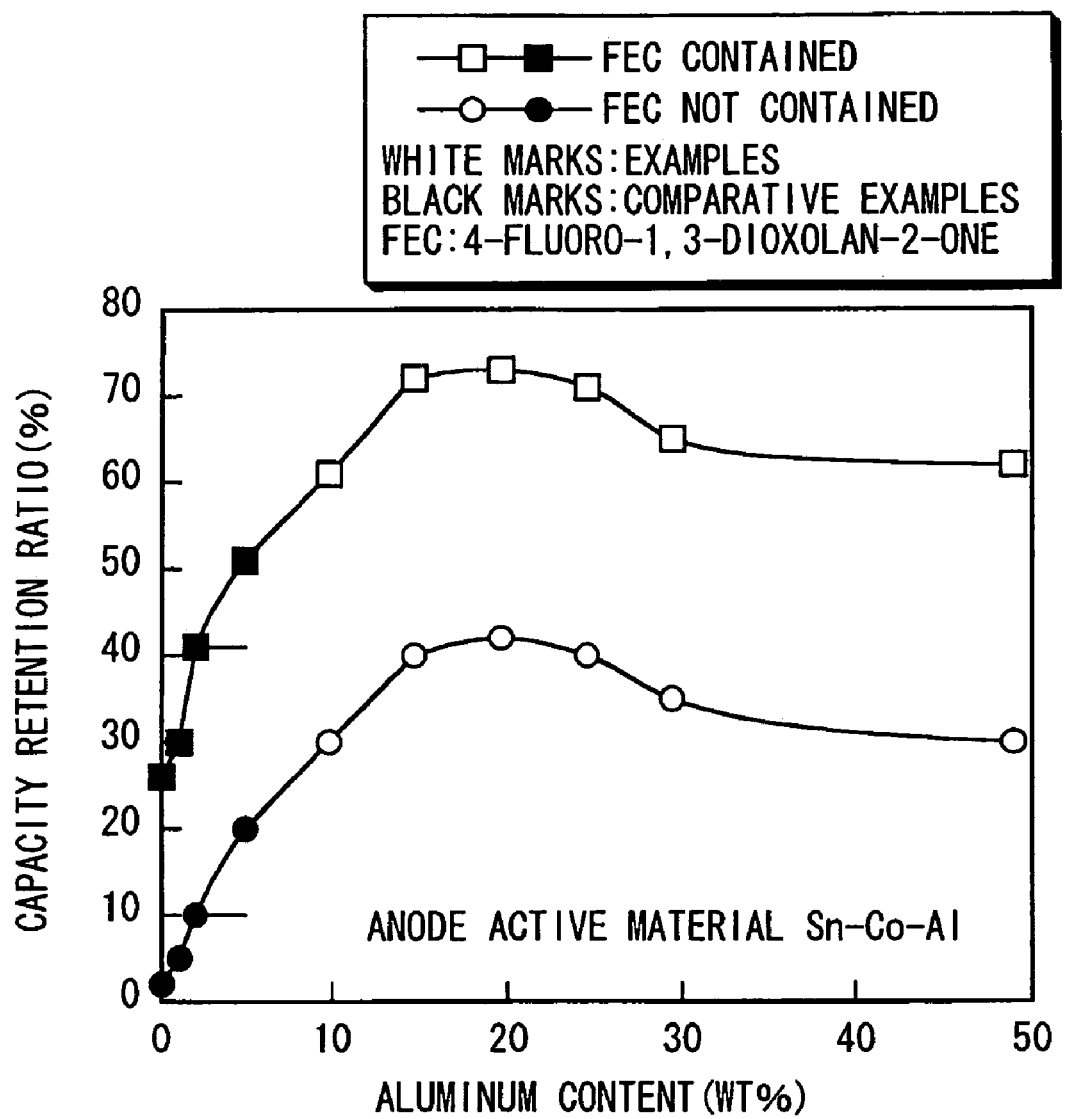
FIG. 9 is a characteristics view showing a relation between contents of aluminum in an anode active material and capacity retention ratios.

Regarding the obtained secondary batteries of Examples 8-1 to 8-6 and Comparative examples 8-1 to 8-3, cycle characteristics were measured as in Examples 1-1 to 1-8. The results are shown in Table 8 and FIG. 9 together with the results of Comparative example 2-4. In FIG. 9, the results are shown together with the results of Examples 7-1 to 7-6 and Comparative examples 1-4 and 7-1 to 7-3.

TABLE 8

| | Composition (wt %) | | | Half bandwidth (°) | Capacity retention ratio (%) |
|---|---|---|---|---|---|
| | Sn | Co | Al | | |
| Example 8-1 | 30.6 | 18.4 | 49 | 5 | 62 |
| Example 8-2 | 42.9 | 25.7 | 29.4 | 5 | 65 |
| Example 8-3 | 45.9 | 27.6 | 24.5 | 5 | 71 |
| Example 8-4 | 49 | 29.4 | 19.6 | 5 | 73 |
| Example 8-5 | 52.1 | 31.2 | 14.7 | 5 | 72 |
| Example 8-6 | 55.1 | 33.1 | 9.8 | 5 | 61 |
| Comparative example 8-1 | 58.2 | 34.9 | 4.9 | 5 | 51 |
| Comparative example 8-2 | 60 | 36 | 2 | 5 | 41 |
| Comparative example 8-3 | 60.6 | 36.4 | 1 | 5 | 30 |
| Comparative example 2-4 | 61.3 | 36.7 | 0 | 5 | 26 |

Solvent: 4-fluoro-1,3-dioxolan-2-one + ethylene carbonate + dimethyl carbonate

As evidenced by Table 8 and FIG. 9, the results similar to of Examples 7-1 to 7-6 were obtained. Further, according to Examples 8-1 to 8-6 using the electrolytic solution containing 4-fluoro-1,3-dioxolan-2-one expressed in Chemical formula 3, the capacity retention ratio was significantly improved than Examples 7-1 to 7-6 using the electrolytic solution not containing 4-fluoro-1,3-dioxolan-2-one. That is, it was found that when the electrolytic solution contained 4-fluoro-1,3-dioxolan-2-one, cycle characteristics could be further improved.

Examples 9-1 to 9-6

Secondary batteries were fabricated as in Examples 1-1 to 1-8, except that the anode active material powders were synthesized by mixing Sn—Co alloy powders and phosphorus powders as raw materials at a given ratio. Then, the anode active material powders were provided with composition analysis. The contents of tin, cobalt, and phosphorus were measured by ICP emission spectrometry. Further, the half bandwidth of the diffraction peak of the reaction phase was measured by X-ray diffraction. The analytical values are shown in Table 9.

TABLE 9

| | Composition (wt %) | | | Half bandwidth (°) | Capacity retention ratio (%) |
|---|---|---|---|---|---|
| | Sn | Co | P | | |
| Example 9-1 | 30.6 | 18.4 | 49 | 5 | 27 |
| Example 9-2 | 42.9 | 25.7 | 29.4 | 5 | 32 |
| Example 9-3 | 45.9 | 27.6 | 24.5 | 5 | 38 |
| Example 9-4 | 49 | 29.4 | 19.6 | 5 | 42 |
| Example 9-5 | 52.1 | 31.2 | 14.7 | 5 | 38 |
| Example 9-6 | 55.1 | 33.1 | 9.8 | 5 | 29 |
| Comparative example 9-1 | 58.2 | 34.9 | 4.9 | 5 | 19 |
| Comparative example 9-2 | 60 | 36 | 2 | 5 | 8 |
| Comparative example 9-3 | 60.6 | 36.4 | 1 | 5 | 4 |
| Comparative example 1-4 | 61.3 | 36.7 | 0 | 5 | 2 |

Solvent: ethylene carbonate + dimethyl carbonate

As Comparative examples 9-1 to 9-3 relative to Examples 9-1 to 9-6, secondary batteries were fabricated as in Examples 9-1 to 9-6, except that the anode active material powders were synthesized by mixing Sn—Co alloy powders and phosphorus powders as raw materials at a given ratio. Then, the contents of phosphorus, tin, and cobalt in the anode active material and the half bandwidth of the diffraction peak of the reaction phase were measured as in Examples 9-1 to 9-6. The analytical values are shown in Table 9 together.

Regarding the obtained secondary batteries of Examples 9-1 to 9-6 and Comparative examples 9-1 to 9-3, cycle characteristics were measured as in Examples 1-1 to 1-8. The results are shown in Table 9 together with the results of Comparative example 1-4.

As evidenced by Table 9, the results similar to of Examples 1-1 to 1-8 were obtained. That is, it was found that when the phosphorus content in the anode active material was from 9.8 wt % to 49 wt %, cycle characteristics could be also improved.

Examples 10-1 to 10-6

Secondary batteries were fabricated as in Examples 9-1 to 9-6, except that a solvent obtained by mixing 4-fluoro-1,3-dioxolan-2-one expressed in Chemical formula 3, ethylene carbonate, and dimethyl carbonate at a mass ratio of 4-fluoro-1,3-dioxolan-2-one:ethylene carbonate:dimethyl carbonate=20:20:60 was used.

As Comparative examples 10-1 to 10-3 relative to Examples 10-1 to 10-6, secondary batteries were fabricated as in Examples 10-1 to 10-6, except that the anode active material powders were synthesized by mixing Sn—Co alloy powders and phosphorus powders as raw materials at a ratio similar to of Comparative examples 9-1 to 9-3.

Figure 10:
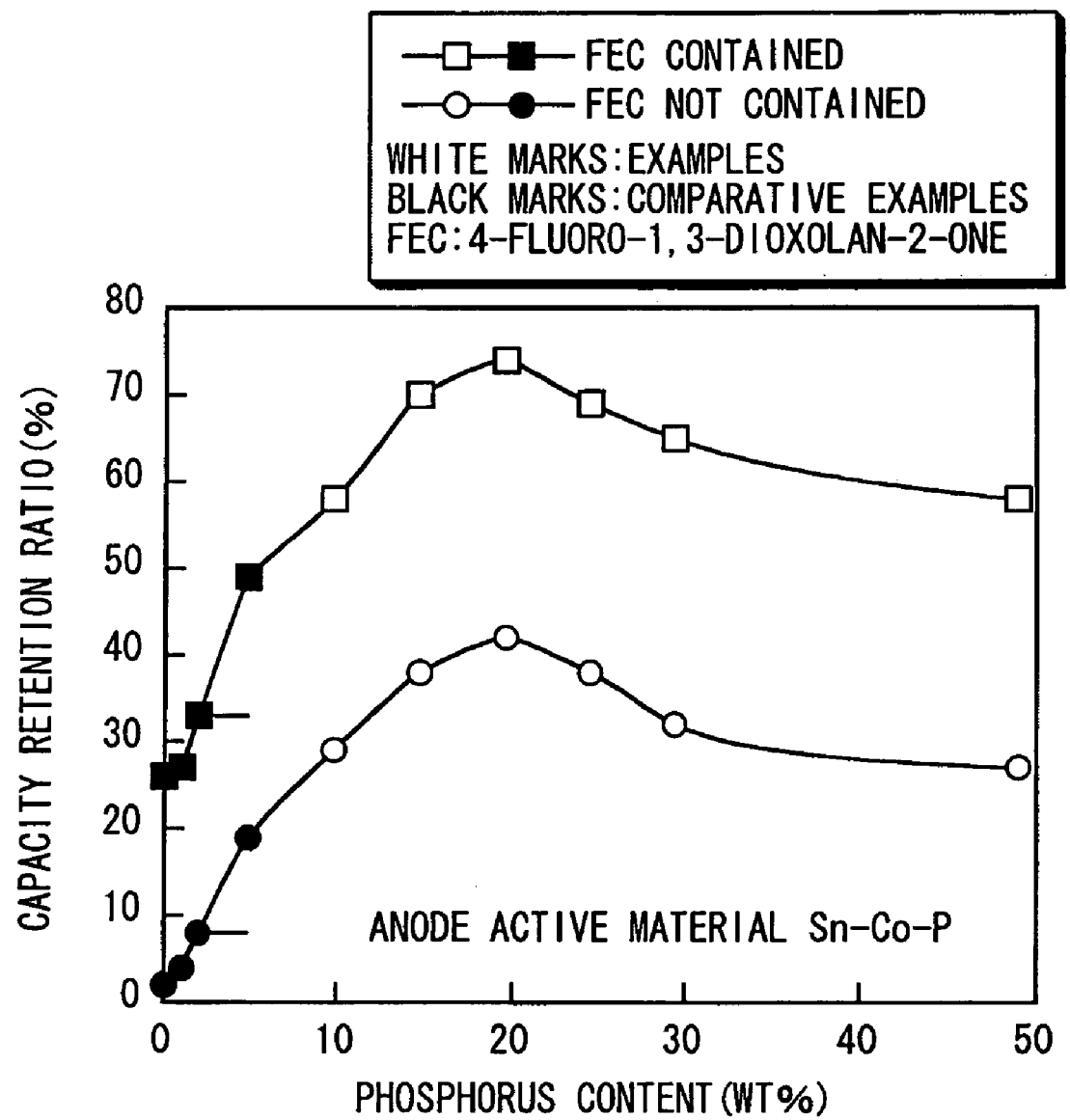
FIG. 10 is a characteristics view showing a relation between contents of phosphorus in an anode active material and capacity retention ratios.

Regarding the obtained secondary batteries of Examples 10-1 to 10-6 and Comparative examples 10-1 to 10-3, cycle characteristics were measured as in Examples 1-1 to 1-8. The results are shown in Table 10 and FIG. 10 together with the results of Comparative example 2-4. In FIG. 10, the results are shown together with the results of Examples 9-1 to 9-6 and Comparative examples 1-4 and 9-1 to 9-3.

TABLE 10

| | Composition (wt %) | | | Half bandwidth (°) | Capacity retention ratio (%) |
|---|---|---|---|---|---|
| | Sn | Co | P | | |
| Example 10-1 | 30.6 | 18.4 | 49 | 5 | 58 |
| Example 10-2 | 42.9 | 25.7 | 29.4 | 5 | 65 |
| Example 10-3 | 45.9 | 27.6 | 24.5 | 5 | 69 |
| Example 10-4 | 49 | 29.4 | 19.6 | 5 | 74 |
| Example 10-5 | 52.1 | 31.2 | 14.7 | 5 | 70 |
| Example 10-6 | 55.1 | 33.1 | 9.8 | 5 | 58 |
| Comparative example 10-1 | 58.2 | 34.9 | 4.9 | 5 | 49 |
| Comparative example 10-2 | 60 | 36 | 2 | 5 | 33 |
| Comparative example 10-3 | 60.6 | 36.4 | 1 | 5 | 27 |
| Comparative example 2-4 | 61.3 | 36.7 | 0 | 5 | 26 |

Solvent: 4-fluoro-1,3-dioxolan-2-one + ethylene carbonate + dimethyl carbonate

As evidenced by Table 10 and FIG. 10, the results similar to of Examples 9-1 to 9-6 were obtained. Further, according to Examples 10-1 to 10-6 using the electrolytic solution containing 4-fluoro-1,3-dioxolan-2-one expressed in Chemical formula 3, the capacity retention ratio was significantly improved than in Examples 9-1 to 9-6 using the electrolytic solution not containing 4-fluoro-1,3-dioxolan-2-one. That is, it was found that when the electrolytic solution contained 4-fluoro-1,3-dioxolan-2-one, cycle characteristics could be further improved.

Examples 11-1 to 11-19

Secondary batteries were fabricated as in Examples 1-5 and 3-4, except that the anode active material powders were synthesized by mixing alloy powders of Sn and the third element and carbon powders as raw materials at a given ratio. Then, the third element was magnesium, titanium, vanadium, chromium, manganese, nickel, copper, zinc, gallium, zirconium, niobium, molybdenum, silver, indium, cerium, hafnium, tantalum, tungsten, or bismuth. Further, the anode active material powders were provided with composition analysis. The carbon content was measured by a carbon-sulfur analyzer, and the contents of tin and the third element were measured by ICP emission spectrometry. Further, the half bandwidth of the diffraction peak of the reaction phase was measured by X-ray diffraction. The analytical values are shown in Table 11. Numerical values in the composition represent a proportion of each element at a mass ratio.

TABLE 11

| | Composition | Half bandwidth (°) | Capacity retention ratio (%) |
|---|---|---|---|
| Example 11-1 | 49Sn—29.4Mg—19.6C | 5 | 51 |
| Example 11-2 | 49Sn—29.4Ti—19.6C | 5 | 60 |
| Example 11-3 | 49Sn—29.4V—19.6C | 5 | 50 |
| Example 11-4 | 49Sn—29.4Cr—19.6C | 5 | 52 |
| Example 11-5 | 49Sn—29.4Mn—19.6C | 5 | 49 |
| Example 3-4 | 49Sn—29.4Fe—19.6C | 5 | 50 |
| Example 1-5 | 49Sn—29.4Co—19.6C | 5 | 60 |
| Example 11-6 | 49Sn—29.4Ni—19.6C | 5 | 52 |
| Example 11-7 | 49Sn—29.4Cu—19.6C | 5 | 54 |
| Example 11-8 | 49Sn—29.4Zn—19.6C | 5 | 51 |
| Example 11-9 | 49Sn—29.4Ga—19.6C | 5 | 50 |
| Example 11-10 | 49Sn—29.4Zr—19.6C | 5 | 52 |
| Example 11-11 | 49Sn—29.4Nb—19.6C | 5 | 52 |
| Example 11-12 | 49Sn—29.4Mo—19.6C | 5 | 50 |
| Example 11-13 | 49Sn—29.4Ag—19.6C | 5 | 52 |
| Example 11-14 | 49Sn—29.4In—19.6C | 5 | 55 |
| Example 11-15 | 49Sn—29.4Ce—19.6C | 5 | 49 |
| Example 11-16 | 49Sn—29.4Hf—19.6C | 5 | 50 |
| Example 11-17 | 49Sn—29.4Ta—19.6C | 5 | 48 |
| Example 11-18 | 49Sn—29.4W—19.6C | 5 | 48 |
| Example 11-19 | 49Sn—29.4Bi—19.6C | 5 | 49 |

Solvent: ethylene carbonate + dimethyl carbonate

Regarding the obtained secondary batteries of Examples 11-1 to 11-19, cycle characteristics were measured as in Examples 1-1 to 1-8. The results are shown in Table 11 together with the results of Examples 1-5 and 3-4.

As evidenced by Table 11, the results similar to of Examples 1-5 and 3-4 were obtained. That is, it was found that even when magnesium, titanium, vanadium, chromium, manganese, iron, cobalt, nickel, copper, zinc, gallium, zirconium, niobium, molybdenum, silver, indium, cerium, hafnium, tantalum, tungsten, or bismuth was contained as the third element, cycle characteristics could be improved.

Examples 12-1 to 12-19

Secondary batteries were fabricated as in Examples 11-1 to 11-19, except that a solvent obtained by mixing 4-fluoro-1,3-dioxolan-2-one expressed in Chemical formula 3, ethylene carbonate, and dimethyl carbonate at a mass ratio of 4-fluoro-1,3-dioxolan-2-one:ethylene carbonate:dimethyl carbonate=20:20:60 was used.

Regarding the obtained secondary batteries of Examples 12-1 to 12-19, cycle characteristics were measured as in Examples 1-1 to 1-8. The results are shown in Table 12 together with the results of Examples 2-5 and 4-4.

TABLE 12

| | Composition | Half bandwidth (°) | Capacity retention ratio (%) |
|---|---|---|---|
| Example 12-1 | 49Sn—29.4Mg—19.6C | 5 | 80 |
| Example 12-2 | 49Sn—29.4Ti—19.6C | 5 | 90 |
| Example 12-3 | 49Sn—29.4V—19.6C | 5 | 78 |
| Example 12-4 | 49Sn—29.4Cr—19.6C | 5 | 78 |
| Example 12-5 | 49Sn—29.4Mn—19.6C | 5 | 75 |
| Example 4-4 | 49Sn—29.4Fe—19.6C | 5 | 78 |
| Example 2-5 | 49Sn—29.4Co—19.6C | 5 | 89 |
| Example 12-6 | 49Sn—29.4Ni—19.6C | 5 | 79 |
| Example 12-7 | 49Sn—29.4Cu—19.6C | 5 | 84 |
| Example 12-8 | 49Sn—29.4Zn—19.6C | 5 | 77 |
| Example 12-9 | 49Sn—29.4Ga—19.6C | 5 | 77 |
| Example 12-10 | 49Sn—29.4Zr—19.6C | 5 | 78 |
| Example 12-11 | 49Sn—29.4Nb—19.6C | 5 | 78 |
| Example 12-12 | 49Sn—29.4Mo—19.6C | 5 | 77 |
| Example 12-13 | 49Sn—29.4Ag—19.6C | 5 | 78 |
| Example 12-14 | 49Sn—29.4In—19.6C | 5 | 85 |
| Example 12-15 | 49Sn—29.4Ce—19.6C | 5 | 77 |
| Example 12-16 | 49Sn—29.4Hf—19.6C | 5 | 76 |
| Example 12-17 | 49Sn—29.4Ta—19.6C | 5 | 76 |
| Example 12-18 | 49Sn—29.4W—19.6C | 5 | 75 |
| Example 12-19 | 49Sn—29.4Bi—19.6C | 5 | 76 |

Solvent: 4-fluoro-1,3-dioxolan-2-one + ethylene carbonate + dimethyl carbonate

As evidenced by Tables 11 and 12, the results similar to of Examples 11-1 to 11-19 were obtained. Further, according to Examples 12-1 to 12-19 using the electrolytic solution containing 4-fluoro-1,3-dioxolan-2-one expressed in Chemical formula 3, the capacity retention ratio was significantly improved than in Examples 11-1 to 11-19 using the electrolytic solution not containing 4-fluoro-1,3-dioxolan-2-one. That is, it was found that when the electrolytic solution contained 4-fluoro-1,3-dioxolan-2-one, cycle characteristics could be further improved.

Examples 13-1 and 13-2

Secondary batteries were fabricated as in Examples 1-1 to 1-8, except that the anode active material powders were synthesized by mixing Sn—Co—In alloy powders or Sn—Co—In—Ti alloy powders and carbon powders as raw materials at a given ratio. Then, the anode active material powders were provided with composition analysis. The carbon content was measured by a carbon-sulfur analyzer, and the contents of tin, cobalt, indium, and titanium were measured by ICP emission spectrometry. Further, the half bandwidth of the diffraction peak of the reaction phase was measured by X-ray diffraction. The analytical values are shown in Table 13. Numerical values in the composition represent a proportion of each element at a mass ratio.

TABLE 13

| | Composition | Half bandwidth (°) | Capacity retention ratio (%) |
|---|---|---|---|
| Example 13-1 | 49Sn—24.4Co—5.0In—19.6C | 5 | 64 |
| Example 13-2 | 48Sn—23.4Co—5.0In—2.0Ti—19.6C | 5 | 70 |

Solvent: ethylene carbonate + dimethyl carbonate

Regarding the obtained secondary batteries of Examples 13-1 and 13-2, cycle characteristics were measured as in Examples 1-1 to 1-8. The results are shown in Table 13 together.

As evidenced by Table 13, the results similar to of Examples 1-5, 3-4, and 11-1 to 11-19 were obtained. That is, it was found that even when two or more third elements were contained in the anode active material, cycle characteristics could be improved.

Examples 14-1 and 14-2

Secondary batteries were fabricated as in Examples 13-1 and 13-2, except that a solvent obtained by mixing 4-fluoro-1,3-dioxolan-2-one expressed in Chemical formula 3, ethylene carbonate, and dimethyl carbonate at a mass ratio of 4-fluoro-1,3-dioxolan-2-one:ethylene carbonate:dimethyl carbonate=20:20:60 was used.

Regarding the obtained secondary batteries of Examples 14-1 and 14-2, cycle characteristics were measured as in Examples 1-1 to 1-8. The results are shown in Table 14 together.

TABLE 14

| | Composition | Half bandwidth (°) | Capacity retention ratio (%) |
|---|---|---|---|
| Example 14-1 | 49Sn—24.4Co—5.0In—19.6C | 5 | 92 |
| Example 14-2 | 48Sn—23.4Co—5.0In—2.0Ti—19.6C | 5 | 94 |

Solvent: 4-fluoro-1,3-dioxolan-2-one + ethylene carbonate + dimethyl carbonate

As evidenced by Tables 13 and 14, the results similar to of Examples 13-1 and 13-2 were obtained. Further, according to Examples 14-1 and 14-2 using the electrolytic solution containing 4-fluoro-1,3-dioxolan-2-one expressed in Chemical formula 3, the capacity retention ratio was significantly improved than in Examples 13-1 and 13-2 using the electrolytic solution not containing 4-fluoro-1,3-dioxolan-2-one. That is, it was found that when the electrolytic solution contained 4-fluoro-1,3-dioxolan-2-one, cycle characteristics could be further improved.

Example 15-1

A secondary battery was fabricated as in Examples 1-1 to 1-8, except that the anode active material powders were synthesized by mixing Sn—Co alloy powders, silicon powders, and carbon powders as raw materials at a given ratio. Then, the anode active material powders were provided with composition analysis. The carbon content was measured by a carbon-sulfur analyzer, and the contents of tin, cobalt, and silicon were measured by ICP emission spectrometry. Further, the half bandwidth of the diffraction peak of the reaction phase was measured by X-ray diffraction. The analytical values are shown in Table 15. Numerical values in the composition represent a proportion of each element at a mass ratio.

TABLE 15

| | Composition | Half bandwidth (°) | Initial discharge capacity (mAh) | Capacity retention ratio (%) |
|---|---|---|---|---|
| Example 1-5 | 49Sn—29.4Co—19.6C | 5 | 3000 | 60 |
| Example 15-1 | 45.1Sn—3.9Si—29.4Co—19.6C | 5 | 3200 | 55 |

Regarding the obtained secondary battery of Example 15-1, cycle characteristics were measured as in Examples 1-1 to 1-8. The results are shown in Table 15 with the initial discharge capacity and the results of Example 1-6.

As evidenced by Table 15, according to Example 15-1 using the anode active material containing silicon, the capacity was improved than in Example 1-5 using the anode active material not containing silicon.

That is, it was found that when the anode active material contained silicon, the capacity could be further improved.

Example 16-1

A secondary battery was fabricated as in example 15-1, except that a solvent obtained by mixing 4-fluoro-1,3-dioxolan-2-one expressed in Chemical formula 3, ethylene carbonate, and dimethyl carbonate at a mass ratio of 4-fluoro-1,3-dioxolan-2-one:ethylene carbonate:dimethyl carbonate=20:20:60 was used.

Regarding the obtained secondary battery of Example 16-1, cycle characteristics were measured as in Examples 1-1 to 1-8. The results are shown in Table 16 together with the results of Example 2-5.

TABLE 16

| | Composition | Half bandwidth (°) | Initial discharge capacity (mAh) | Capacity retention ratio (%) |
|---|---|---|---|---|
| Example 2-5 | 49Sn—29.4Co—19.6C | 5 | 3005 | 89 |
| Example 16-1 | 45.1Sn—3.9Si—29.4Co—19.6C | 5 | 3208 | 85 |

As evidenced by Tables 15 and 16, the results similar to of Example 15-1 were obtained. Further, according to Example 16-1 using the electrolytic solution containing 4-fluoro-1,3-dioxolan-2-one expressed in Chemical formula 3, the capacity retention ratio was improved than in Example 15-1 using the electrolytic solution not containing 4-fluoro-1,3-dioxolan-2-one. That is, it was found that when the electrolytic solution contained 4-fluoro-1,3-dioxolan-2-one, cycle characteristics could be further improved.

Examples 17-1 to 17-18

Secondary batteries were fabricated as in Examples 1-5 and 2-5, except that a solvent obtained by mixing 4-fluoro-1,3-dioxolan-2-one expressed in Chemical formula 3, ethylene carbonate, and dimethyl carbonate was used, or except that a solvent obtained by mixing 4-fluoro-1,3-dioxolan-2-one and dimethyl carbonate was used, or except that a solvent obtained by mixing 4-fluoro-1,3-dioxolan-2-one, propylene carbonate, and dimethyl carbonate was used.

Then, the respective mass ratios of 4-fluoro-1,3-dioxolan-2-one:ethylene carbonate:dimethyl carbonate in Examples 17-1 to 17-9 were 0.1:39.9:60, 0.5:39.5:60, 1:39:60, 5:35:60, 10:30:60, 15:25:60, 25:15:60, 30:10:60, and 35:5:60. The respective mass ratios of 4-fluoro-1,3-dioxolan-2-one:dimethyl carbonate in Examples 17-10 to 17-16 were 40:60, 50:50, 60:40, 65:35, 70:30, 80:20 and 90:10. The respective mass ratios of 4-fluoro-1,3-dioxolan-2-one:propylene carbonate:dimethyl carbonate in Examples 17-17 and 17-18 were 30:10:60 and 20:20:60.

Regarding the obtained secondary batteries of Examples 17-1 to 17-18, cycle characteristics were measured as in Examples 1-1 to 1-8. The results are shown in Table 17 together with the results of Examples 1-5 and 2-5.

TABLE 17

| | | Solvent (wt %) | | | | Capacity retention ratio (%) |
|---|---|---|---|---|---|---|
| | Composition | FEC | EC | PC | DMC | |
| Example 1-5 | 49Sn—29.4Co—19.6C | 0 | 40 | 0 | 60 | 60 |
| Example 17-1 | | 0.1 | 39.9 | 0 | 60 | 67 |
| Example 17-2 | | 0.5 | 39.5 | 0 | 60 | 68 |
| Example 17-3 | | 1 | 39 | 0 | 60 | 69 |
| Example 17-4 | | 5 | 35 | 0 | 60 | 83 |
| Example 17-5 | | 10 | 30 | 0 | 60 | 85 |
| Example 17-6 | | 15 | 25 | 0 | 60 | 88 |
| Example 2-5 | | 20 | 20 | 0 | 60 | 89 |
| Example 17-7 | | 25 | 15 | 0 | 60 | 90 |
| Example 17-8 | | 30 | 10 | 0 | 60 | 91 |
| Example 17-9 | | 35 | 5 | 0 | 60 | 92 |
| Example 17-10 | | 40 | 0 | 0 | 60 | 93 |
| Example 17-11 | | 50 | 0 | 0 | 50 | 90 |
| Example 17-12 | | 60 | 0 | 0 | 40 | 87 |
| Example 17-13 | | 65 | 0 | 0 | 35 | 83 |
| Example 17-14 | | 70 | 0 | 0 | 30 | 79 |
| Example 17-15 | | 80 | 0 | 0 | 20 | 70 |
| Example 17-16 | | 90 | 0 | 0 | 10 | 62 |
| Example 17-17 | | 30 | 0 | 10 | 60 | 90 |
| Example 17-18 | | 20 | 0 | 20 | 60 | 87 |

FEC: 4-fluoro-1,3-dioxolan-2-one
EC: ethylene carbonate
PC: propylene carbonate
DMC: dimethyl carbonate As evidenced by Table 17, according to Examples 1-5, 2-5, and 17-1 to 17-16, the capacity retention ratio was increased as the content of 4-fluoro-1,3-dioxolan-2-one in the solvent was increased, showed the maximum value, and then was decreased as the content of dimethyl carbonate which is the solvent with a low boiling point was decreased. According to Examples 17-17 and 17-18, even if propylene carbonate was contained as a solvent with a high boiling point, the capacity retention ratio was improved. That is, it was found that when the content of 4-fluoro-1,3-dioxolan-2-one in the solvent was in the range from 0.1 wt % to 80 wt %, it was effective. Further, it was found that when other solvents with high boiling point were used instead of ethylene carbonate, cycle characteristics could be improved.

Examples 18-1 and 18-2

Secondary batteries were fabricated as in Example 2-5, except that a solvent obtained by mixing 4-fluoro-1,3-dioxolan-2-one expressed in Chemical formula 3, ethylene carbonate, and ethyl methyl carbonate at a mass ratio of 4-fluoro-1,3-dioxolan-2-one:ethylene carbonate:ethyl methyl carbonate=20:20:60 was used, or except that a solvent obtained by mixing 4-fluoro-1,3-dioxolan-2-one, ethylene carbonate, and diethyl carbonate at a mass ratio of 4-fluoro-1,3-dioxolan-2-one:ethylene carbonate:diethyl carbonate=20:20:60 was used.

Regarding the obtained secondary batteries of Examples 18-1 and 18-2, cycle characteristics were measured as in Examples 1-1 to 1-8. The results are shown in Table 18 together with the results of Example 2-5.

TABLE 18

| | Composition | Solvent | Capacity retention ratio (%) |
|---|---|---|---|
| Example 2-5 | 49Sn—29.4Co—19.6C | FEC + EC + DMC | 89 |
| Example 18-1 | | FEC + EC + EMC | 88 |
| Example 18-2 | | FEC + EC + DEC | 85 |

FEC: 4-fluoro-1,3-dioxolan-2-one
EC: ethylene carbonate
EMC: ethyl methyl carbonate
DEC: diethyl carbonate As evidenced by Table 18, the result similar to of Example 2-5 could be obtained. That is, it was found that a solvent with a low boiling point other than dimethyl carbonate was used for the electrolytic solution, cycle characteristics could be improved.

Examples 19-1 to 19-6

Secondary batteries were fabricated as in Examples 1-5 and 2-5, except that a solvent obtained by mixing a cyclic ester carbonate derivative having halogen atoms other than 4-fluoro-1,3-dioxolan-2-one expressed in Chemical formula 3, ethylene carbonate, and dimethyl carbonate at a mass ratio of the cyclic ester carbonate derivative having halogen atoms:ethylene carbonate:dimethyl carbonate=20:20:60 was used. Then, regarding the cyclic ester carbonate derivative having halogen atoms, 4-difluoro-1,3-dioxolan-2-one expressed in Chemical formula 4 was used in Example 19-1, 4-difluoro-5-fluoro-1,3-dioxolan-2-one expressed in Chemical formula 6 was used in Example 19-2, 4-chrolo-1,3-dioxolan-2-one expressed in Chemical formula 7 was used in Example 19-3, 4-bromo-1,3-dioxolan-2-one expressed in Chemical formula 9 was used in Example 19-4,4-iodine-1,3-dioxolan-2-one expressed in Chemical formula 10 was used in Example 19-5, and 4-fluoromethyl-1,3-dioxolan-2-one expressed in Chemical formula 11 was used in Example 19-6.

Regarding the obtained secondary batteries of Examples 19-1 to 19-6, cycle characteristics were measured as in Examples 1-1 to 1-8. The results are shown in Table 19 together with the results of Examples 1-5 and 2-5.

TABLE 19

| | Composition | Solvent | Capacity retention ratio (%) |
|---|---|---|---|
| Example 1-5 | 49Sn—29.4Co—19.6C | EC + DMC | 60 |
| Example 2-5 | | FEC + EC + DMC | 89 |
| Example 19-1 | | DFEC + EC + DMC | 80 |
| Example 19-2 | | tri-FEC + EC + DMC | 77 |
| Example 19-3 | | Cl-EC + EC + DMC | 81 |
| Example 19-4 | | Br-EC + EC + DMC | 75 |
| Example 19-5 | | I-EC + EC + DMC | 72 |
| Example 19-6 | | F-PC + EC + DMC | 82 |

EC: ethylene carbonate
DMC: dimethyl carbonate
FEC: 4-fluoro-1,3-dioxolan-2-one
DFEC: 4-difluoro-1,3-dioxolan-2-one
F-PC: 4-fluoromethyl-1,3-dioxolan-2-one
tri-FEC: 4-difluoro-5-fluoro-1,3-dioxolan-2-one
Cl-EC: 4-chrolo-1,3-dioxolan-2-one
Br-EC: 4-bromo-1,3-dioxolan-2-one
I-EC: 4-iodine-1,3-dioxolan-2-one As evidenced by Table 19, the results similar to of Example 2-5 could be obtained. Further, according to Example 2-5 using the electrolytic solution containing 4-fluoro-1,3-dioxolan-2-one, the capacity retention ratio was improved than in Examples 19-1 to 19-6 using the electrolytic solution containing other cyclic ester carbonate having halogen atoms.

That is, it was found that when the electrolytic solution contained the cyclic ester carbonate derivative having halogen atoms, cycle characteristics could be improved, and in particular, the electrolytic solution preferably contained 4-fluoro-1,3-dioxolan-2-one.

Example 20-1

A secondary battery was fabricated as in example 1-5, except that a solvent obtained by mixing ethylene carbonate, dimethyl carbonate, and 1,3-dioxole-2-one at a mass ratio of ethylene carbonate:dimethyl carbonate:1,3-dioxole-2-one=38:60:2 was used.

Regarding the obtained secondary battery of Example 20-1, cycle characteristics were measured as in Examples 1-1 to 1-8. The results are shown in Table 20 together with the results of Example 1-5.

TABLE 20

| | Composition | Solvent (wt %) | | | Capacity retention ratio (%) |
|---|---|---|---|---|---|
| | | EC | DMC | VC | |
| Example 1-5 | 49Sn—29.4Co—19.6C | 40 | 60 | 0 | 60 |
| Example 20-1 | | 38 | 60 | 2 | 61 |

EC: ethylene carbonate
DMC: dimethyl carbonate
VC: 1,3-dioxole-2-one

As evidenced by Table 20, according to Example 20-1 using the electrolytic solution containing 1,3-dioxole-2-one, the capacity retention ratio was improved than in Example 1-5 using the electrolytic solution not containing 1,3-dioxole-2-one. That is, it was found that when the electrolytic solution contained 1,3-dioxole-2-one, cycle characteristics could be further improved.

Examples 21-1 to 21-7

Secondary batteries were fabricated as in Example 17-5, except that a solvent obtained by mixing 4-fluoro-1,3-dioxolan-2-one expressed in Chemical formula 3, ethylene carbonate, dimethyl carbonate, and 1,3-dioxole-2-one was used. Then, the respective mass ratios of 4-fluoro-1,3-dioxolan-2-one ethylene carbonate:dimethyl carbonate: 1,3-dioxole-2-one in Examples 21-1 to 21-7 were 10:29.5:60:0.5, 10:29:60:1, 10:28:60:2, 10:25:60:5, 10:22:60:8, 10:20:60:10, and 10:18:60:12.

Regarding the obtained secondary batteries of Examples 21-1 to 21-7, cycle characteristics were measured as in Examples 1-1 to 1-8. The results are shown in Table 21 together with the results of Example 17-5.

TABLE 21

| | Composition | Solvent (wt %) | | | | Capacity retention ratio (%) |
|---|---|---|---|---|---|---|
| | | FEC | EC | DMC | VC | |
| Example 17-5 | 49Sn—29.4Co—19.6C | 10 | 30 | 60 | 0 | 85 |
| Example 21-1 | | 10 | 29.5 | 60 | 0.5 | 92 |
| Example 21-2 | | 10 | 29 | 60 | 1 | 93 |
| Example 21-3 | | 10 | 28 | 60 | 2 | 94 |
| Example 21-4 | | 10 | 25 | 60 | 5 | 93 |
| Example 21-5 | | 10 | 22 | 60 | 8 | 91 |
| Example 21-6 | | 10 | 20 | 60 | 10 | 90 |

TABLE 21-continued

| Composition | Solvent (wt %) | | | | Capacity retention ratio (%) |
| --- | --- | --- | --- | --- | --- |
| | FEC | EC | DMC | VC | |
| Example 21-7 | 10 | 18 | 60 | 12 | 87 |

FEC: 4-fluoro-1,3-dioxolan-2-one
EC: ethylene carbonate
DMC: dimethyl carbonate
VC: 1,3-dioxole-2-one As evidenced by Table 21, according to Examples 21-1 to 21-7 using the electrolytic solution containing 1,3-dioxole-2-one, the capacity retention ratio was improved than in Example 17-5 using the electrolytic solution not containing 1,3-dioxole-2-one. Further, the capacity retention ratio was increased as the content of 1,3-dioxole-2-one was increased, showed the maximum value, and then was decreased. That is, it was found that when 1,3-dioxole-2-one was contained in the electrolytic solution, cycle characteristics could be further improved even if 4-fluoro-1,3-dioxole-2-one was contained, in particular, it was preferable that the content of 1,3-dioxole-2-one was in the range from 0.5 wt % to 10 wt %.

Examples 22-1 to 22-8 and 23-1 to 23-8

The secondary batteries shown in FIG. 3 and FIG. 4 were fabricated. First, as in Examples 1-1 to 1-8, the cathode 33 and the anode 34 were formed. Then, for the cathode 33, Ketjen black of Lion Corporation was used as a conductive material. Further, for the anode 34 for which an anode active material synthesized by mixing Sn—Co alloy powders and carbon powders, instead of graphite as a conductive material (KS-15 of Lonza), other graphite (MESOPHASE FINE CARBON, GRAPHITE POWDER, spherical crystal graphite of JFE Steel) was used.

Next, as a high molecular weight compound, a mixture obtained by mixing a copolymer of polyvinylidene fluoride and hexafluoro propylene whose molecular weight was 0.7 million (A) by weight-average molecular weight and a copolymer of polyvinylidene fluoride and hexafluoro propylene whose molecular weight was 0.31 million (B) by weight-average molecular weight at a mass ratio of (A):(B)=9:1 was prepared. The ratio of hexafluoro propylene in the copolymer was 7 wt %. Subsequently, the high molecular weight compound, an electrolytic solution, and dimethyl carbonate as the mixed solvent were mixed at a mass ratio of high molecular weight compound:electrolytic solution:dimethyl carbonate=1:4:8, stirred and dissolved at 70 deg C. to fabricate a sol precursor solution. As the electrolytic solution, the solution in which $LiPF_6$ as an electrolyte salt was dissolved in a solvent so that the content of $LiPF_6$ became 0.7 mol/kg was used. As the solvent, in Examples 22-1 to 22-8, a mixture obtained by mixing ethylene carbonate, propylene carbonate, and 1,3-dioxole-2-one at a mass ratio of ethylene carbonate:propylene carbonate:1,3-dioxole-2-one=49:49:2 was used. In Examples 23-1 to 23-8, a mixture obtained by mixing 4-fluoro-1,3-dioxolan-2-one, propylene carbonate, and 1,3-dioxole-2-one at a mass ratio of 4-fluoro-1,3-dioxolan-2-one:propylene carbonate:1,3-dioxole-2-one=49:49:2 was used.

The cathode 33 and the anode 34 were respectively coated with the obtained precursor solution by using a bar coater, and then, the mixed solvent was volatilized in a constant temperature bath at 70 deg C. to form the gelatinous electrolyte layer 36.

After that, the cathode 33 and the anode 34 on which the electrolyte layer 36 was respectively formed were layered with the separator 35 made of polyethylene being 16 μm thick (E16MMS of Tonen Chemical Corporation) inbetween, flatly wound to form the spirally wound electrode body 30.

The obtained spirally wound electrode body 30 was enclosed under reduced pressure into the package member 40 made of a laminated film. Thereby, the secondary batteries shown in FIG. 3 and FIG. 4 were fabricated.

As Comparative examples 22-1 to 22-5 and 23-1 to 23-5 relative to Examples 22-1 to 22-8 and 23-1 to 23-8, secondary batteries were fabricated as in Examples 22-1 to 22-8 and 23-1 to 23-8, except that the anode active material powders synthesized by mixing Sn—Co alloy powders and carbon powders as raw materials at a ratio similar to of Comparative examples 1-1 to 1-3 and 1-5 was used, or except that Sn—Co alloy powders similar to of Comparative example 1-4 were used as an anode active material.

Regarding the obtained secondary batteries of Examples 22-1 to 22-8 and 23-1 to 23-8 and Comparative examples 22-1 to 22-5 and 23-1 to 23-5cycle characteristics were measured. The results are shown in Tables 22 and 23 and FIG. 11.

TABLE 22

| | Composition (wt %) | | | Half bandwidth (°) | Capacity retention ratio (%) |
| --- | --- | --- | --- | --- | --- |
| | Sn | Co | C | | |
| Example 22-1 | 30.6 | 18.4 | 49 | 5 | 43 |
| Example 22-2 | 36.8 | 22 | 39.2 | 5 | 49 |
| Example 22-3 | 42.9 | 25.7 | 29.4 | 5 | 58 |
| Example 22-4 | 45.9 | 27.6 | 24.5 | 5 | 60 |
| Example 22-5 | 49 | 29.4 | 19.6 | 5 | 59 |
| Example 22-6 | 52.1 | 31.2 | 14.7 | 5 | 56 |
| Example 22-7 | 53.9 | 32.3 | 11.8 | 5 | 55 |
| Example 22-8 | 55.1 | 33.1 | 9.8 | 5 | 54 |
| Comparative example 22-1 | 56.4 | 33.8 | 7.8 | 5 | 32 |
| Comparative example 22-2 | 58.2 | 34.9 | 4.9 | 5 | 20 |
| Comparative example 22-3 | 60.6 | 36.4 | 1 | 5 | 11 |
| Comparative example 22-4 | 61.3 | 36.7 | 0 | 5 | 1 |
| Comparative example 22-5 | 27.6 | 16.5 | 53.9 | 5 | 38 |

Solvent: ethylene carbonate + propylene carbonate + 1,3-dioxole-2-one

TABLE 23

| | Composition (wt %) | | | Half bandwidth (°) | Capacity retention ratio (%) |
| --- | --- | --- | --- | --- | --- |
| | Sn | Co | C | | |
| Example 23-1 | 30.6 | 18.4 | 49 | 5 | 75 |
| Example 23-2 | 36.8 | 22 | 39.2 | 5 | 83 |
| Example 23-3 | 42.9 | 25.7 | 29.4 | 5 | 87 |
| Example 23-4 | 45.9 | 27.6 | 24.5 | 5 | 89 |
| Example 23-5 | 49 | 29.4 | 19.6 | 5 | 92 |
| Example 23-6 | 52.1 | 31.2 | 14.7 | 5 | 88 |

TABLE 23-continued

| | Composition (wt %) | | | Half bandwidth (°) | Capacity retention ratio (%) |
|---|---|---|---|---|---|
| | Sn | Co | C | | |
| Example 23-7 | 53.9 | 32.3 | 11.8 | 5 | 85 |
| Example 23-8 | 55.1 | 33.1 | 9.8 | 5 | 83 |
| Comparative example 23-1 | 56.4 | 33.8 | 7.8 | 5 | 62 |
| Comparative example 23-2 | 58.2 | 34.9 | 4.9 | 5 | 50 |
| Comparative example 23-3 | 60.6 | 36.4 | 1 | 5 | 37 |
| Comparative example 23-4 | 61.3 | 36.7 | 0 | 5 | 21 |
| Comparative example 23-5 | 27.6 | 16.5 | 53.9 | 5 | 65 |

Solvent: 4-fluoro-1,3-dioxolan-2-one + propylene carbonate + 1,3-dioxole-2-one

The cycle characteristics were measured as follows. First, after constant current-constant voltage charge at 830 mA was performed in the environment of 25 deg C. to the final voltage of 2.6 V, constant current discharge at 660 mA was performed to the final voltage of 2.6 V. 150 cycles of charge and discharge were performed under the same charge and discharge conditions, and the discharge capacity retention ratio (%) at the 150th cycle was obtained where the discharge capacity at the first cycle was 100.

Figure 11:
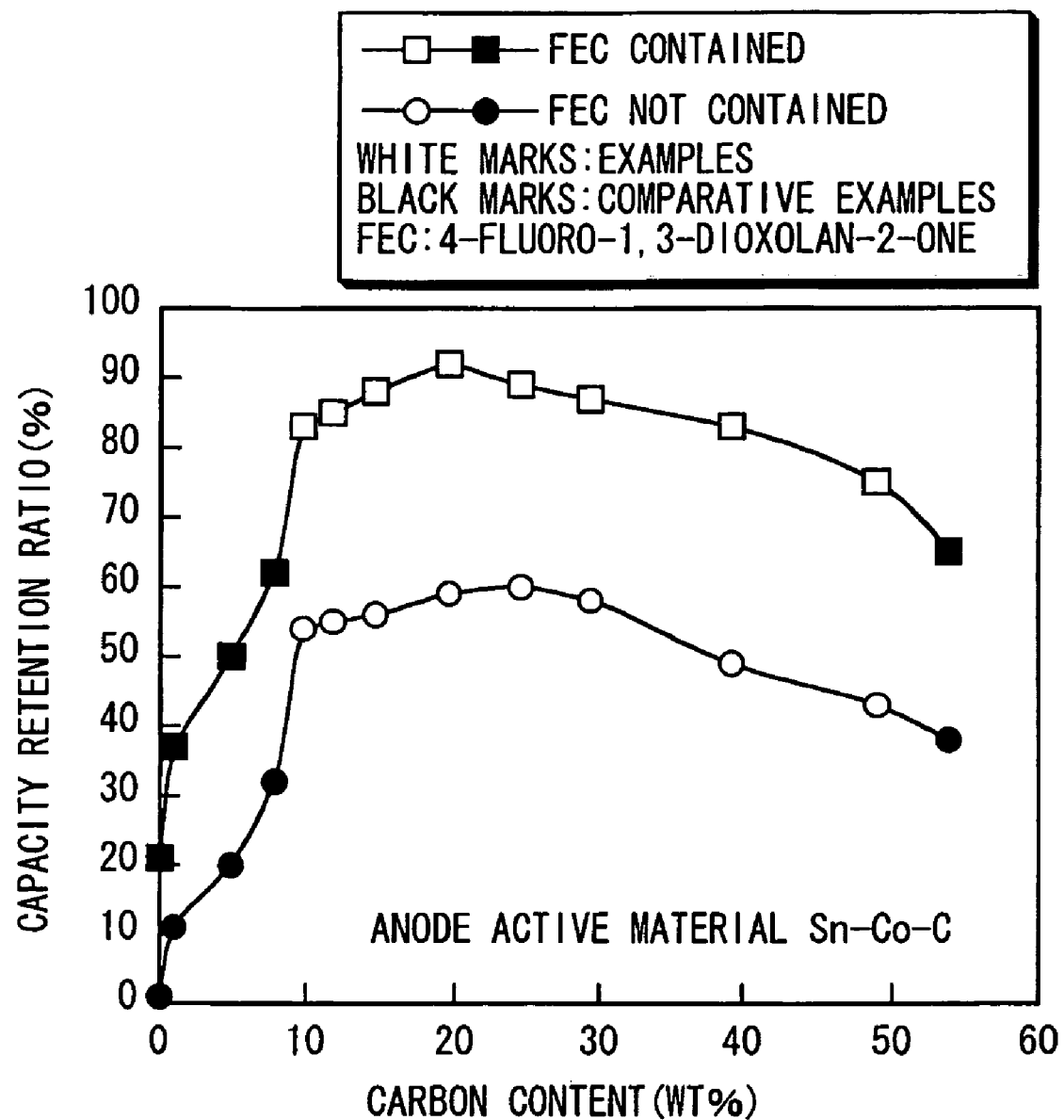
FIG. 11 is another characteristics view showing a relation between contents of carbon in an anode active material and capacity retention ratios.

As shown in Tables 22 and 23 and FIG. 11, the results similar to of Examples 1-1 to 1-8 and 2-1 to 2-8 were obtained. That is, it was found that when the carbon content in the anode active material was from 9.8 wt % to 49 wt %, cycle characteristics could be improved even if the gelatinous electrolyte was used, in particular, when the electrolytic solution contained 4-fluoro-1,3-dioxolan-2-one, cycle characteristics could be further improved.

Examples 24-1 to 24-6, 25-1 to 25-6, 26-1 to 26-6, 27-1 to 27-6, and 29-1 to 29-6

As Examples 24-1 to 24-6 and 25-1 to 25-6, secondary batteries were fabricated as in Examples 22-1 to 22-8 and 23-1 to 23-8, except that the anode active material powders synthesized by mixing Sn—Co alloy powders and boron powders as raw materials at a ratio similar to of Examples 5-1 to 5-6 was used. Further, as Comparative examples 24-1, 24-2, 25-1, and 25-2 relative to Examples 24-1 to 24-6 and 25-1 to 25-6, secondary batteries were fabricated as in Examples 24-1 to 24-6 and 25-1 to 25-6, except that the anode active material powders synthesized by mixing Sn—Co alloy powders and boron powders as raw materials at a ratio similar to of Comparative examples 5-1 and 5-2 was used.

As Examples 26-1 to 26-6 and 27-1 to 27-6, secondary batteries were fabricated as in Examples 22-1 to 22-8 and 23-1 to 23-8, except that the anode active material powders synthesized by mixing Sn—Co alloy powders and aluminum powders as raw materials at a ratio similar to of Examples 7-1 to 7-6 was used. Further, as Comparative examples 26-1 to 26-3 and 27-1 to 27-3 relative to Examples 26-1 to 26-6 and 27-1 to 27-6, second batteries were fabricated as in Examples 26-1 to 26-6 and 27-1 to 27-6, except that the anode active material powders synthesized by mixing Sn—Co alloy powders and aluminum powders as raw materials at a ratio similar to of Comparative examples 7-1 to 7-3 was used.

As Examples 28-1 to 28-6 and 29-1 to 29-6, secondary batteries were fabricated as in Examples 22-1 to 22-8 and 23-1 to 23-8, except that the anode active material powders synthesized by mixing Sn—Co alloy powders and phosphorus powders as raw materials at a ratio similar to of Examples 9-1 to 9-6 was used. Further, as Comparative examples 28-1 to 28-3 and 29-1 to 29-3 relative to Examples 28-1 to 28-6 and 29-1 to 29-6, second batteries were fabricated as in Examples 28-1 to 28-6 and 29-1 to 29-6, except that the anode active material powders synthesized by mixing Sn—Co alloy powders and phosphorus powders as raw materials at a ratio similar to of Comparative examples 9-1 to 9-3 was used.

Regarding the obtained secondary batteries of Examples 24-1 to 24-6, 25-1 to 25-6, 26-1 to 26-6, 27-1 to 27-6, 28-1 to 28-6, and 29Comparative examples 24-1, 24-2, 25-1, 25-2, 26-1 to 26-3, 27-1 to 27-3, 28- 1 to 28-3, and 29-1 to 29-3, cycle characteristics were measured as in Examples 22-1 to 22-8 and 23-1 to 23-8. The results are shown in s 24 to 29 and FIGS. 12 to 14 together with the results of Comparative examples 22-4 and 23-4.

TABLE 24

| | Composition (wt %) | | | Half bandwidth (°) | Capacity retention ratio (%) |
|---|---|---|---|---|---|
| | Sn | Co | B | | |
| Example 24-1 | 30.6 | 18.4 | 49 | 5 | 28 |
| Example 24-2 | 36.8 | 22 | 39.2 | 5 | 34 |
| Example 24-3 | 42.9 | 25.7 | 29.4 | 5 | 41 |
| Example 24-4 | 49 | 29.4 | 19.6 | 5 | 41 |
| Example 24-5 | 52.1 | 31.2 | 14.7 | 5 | 33 |
| Example 24-6 | 55.1 | 33.1 | 9.8 | 5 | 30 |
| Comparative example 24-1 | 56.4 | 33.8 | 7.8 | 5 | 24 |
| Comparative example 24-2 | 27.6 | 16.5 | 53.9 | 5 | 22 |
| Comparative example 22-4 | 61.3 | 36.7 | 0 | 5 | 1 |

Solvent: ethylene carbonate + propylene carbonate + 1,3-dioxole-2-one

TABLE 25

| | Composition (wt %) | | | Half bandwidth (°) | Capacity retention ratio (%) |
|---|---|---|---|---|---|
| | Sn | Co | B | | |
| Example 25-1 | 30.6 | 18.4 | 49 | 5 | 60 |
| Example 25-2 | 36.8 | 22 | 39.2 | 5 | 62 |
| Example 25-3 | 42.9 | 25.7 | 29.4 | 5 | 71 |
| Example 25-4 | 49 | 29.4 | 19.6 | 5 | 69 |
| Example 25-5 | 52.1 | 31.2 | 14.7 | 5 | 64 |
| Example 25-6 | 55.1 | 33.1 | 9.8 | 5 | 60 |
| Comparative example 25-1 | 56.4 | 33.8 | 7.8 | 5 | 52 |
| Comparative example 25-2 | 27.6 | 16.5 | 53.9 | 5 | 50 |
| Comparative example 23-4 | 61.3 | 36.7 | 0 | 5 | 21 |

Solvent: 4-fluoro-1,3-dioxolan-2-one + propylene carbonate + 1,3-dioxole-2-one

TABLE 26

|  | Composition (wt %) | | | Half bandwidth (°) | Capacity retention ratio (%) |
|---|---|---|---|---|---|
|  | Sn | Co | Al | | |
| Example 26-1 | 30.6 | 18.4 | 49 | 5 | 28 |
| Example 26-2 | 42.9 | 25.7 | 29.4 | 5 | 33 |
| Example 26-3 | 45.9 | 27.6 | 24.5 | 5 | 39 |
| Example 26-4 | 49 | 29.4 | 19.6 | 5 | 41 |
| Example 26-5 | 52.1 | 31.2 | 14.7 | 5 | 41 |
| Example 26-6 | 55.1 | 33.1 | 9.8 | 5 | 28 |
| Comparative example 26-1 | 58.2 | 34.9 | 4.9 | 5 | 17 |
| Comparative example 26-2 | 60 | 36 | 2 | 5 | 8 |
| Comparative example 26-3 | 60.6 | 36.4 | 1 | 5 | 3 |
| Comparative example 22-4 | 61.3 | 36.7 | 0 | 5 | 1 |

Solvent: ethylene carbonate + propylene carbonate + 1,3-dioxole-2-one

TABLE 27

|  | Composition (wt %) | | | Half bandwidth (°) | Capacity retention ratio (%) |
|---|---|---|---|---|---|
|  | Sn | Co | Al | | |
| Example 27-1 | 30.6 | 18.4 | 49 | 5 | 60 |
| Example 27-2 | 42.9 | 25.7 | 29.4 | 5 | 64 |
| Example 27-3 | 45.9 | 27.6 | 24.5 | 5 | 70 |
| Example 27-4 | 49 | 29.4 | 19.6 | 5 | 73 |
| Example 27-5 | 52.1 | 31.2 | 14.7 | 5 | 71 |
| Example 27-6 | 55.1 | 33.1 | 9.8 | 5 | 60 |
| Comparative example 27-1 | 58.2 | 34.9 | 4.9 | 5 | 49 |
| Comparative example 27-2 | 60 | 36 | 2 | 5 | 40 |
| Comparative example 27-3 | 60.6 | 36.4 | 1 | 5 | 29 |
| Comparative example 23-4 | 61.3 | 36.7 | 0 | 5 | 21 |

Solvent: 4-fluoro-1,3-dioxolan-2-one + propylene carbonate + 1,3-dioxole-2-one

TABLE 28

|  | Composition (wt %) | | | Half bandwidth (°) | Capacity retention ratio (%) |
|---|---|---|---|---|---|
|  | Sn | Co | P | | |
| Example 28-1 | 30.6 | 18.4 | 49 | 5 | 26 |
| Example 28-2 | 42.9 | 25.7 | 29.4 | 5 | 32 |
| Example 28-3 | 45.9 | 27.6 | 24.5 | 5 | 37 |
| Example 28-4 | 49 | 29.4 | 19.6 | 5 | 41 |
| Example 28-5 | 52.1 | 31.2 | 14.7 | 5 | 39 |
| Example 28-6 | 55.1 | 33.1 | 9.8 | 5 | 28 |
| Comparative example 28-1 | 58.2 | 34.9 | 4.9 | 5 | 19 |
| Comparative example 28-2 | 60 | 36 | 2 | 5 | 8 |
| Comparative example 28-3 | 60.6 | 36.4 | 1 | 5 | 4 |
| Comparative example 22-4 | 61.3 | 36.7 | 0 | 5 | 1 |

Solvent: ethylene carbonate + propylene carbonate + 1,3-dioxole-2-one

TABLE 29

|  | Composition (wt %) | | | Half bandwidth (°) | Capacity retention ratio (%) |
|---|---|---|---|---|---|
|  | Sn | Co | P | | |
| Example 29-1 | 30.6 | 18.4 | 49 | 5 | 58 |
| Example 29-2 | 42.9 | 25.7 | 29.4 | 5 | 66 |
| Example 29-3 | 45.9 | 27.6 | 24.5 | 5 | 69 |
| Example 29-4 | 49 | 29.4 | 19.6 | 5 | 75 |
| Example 29-5 | 52.1 | 31.2 | 14.7 | 5 | 70 |
| Example 29-6 | 55.1 | 33.1 | 9.8 | 5 | 57 |
| Comparative example 29-1 | 58.2 | 34.9 | 4.9 | 5 | 49 |
| Comparative example 29-2 | 60 | 36 | 2 | 5 | 32 |
| Comparative example 29-3 | 60.6 | 36.4 | 1 | 5 | 27 |
| Comparative example 23-4 | 61.3 | 36.7 | 0 | 5 | 21 |

Solvent: 4-fluoro-1,3-dioxolan-2-one + propylene carbonate + 1,3-dioxole-2-one

Figure 12:
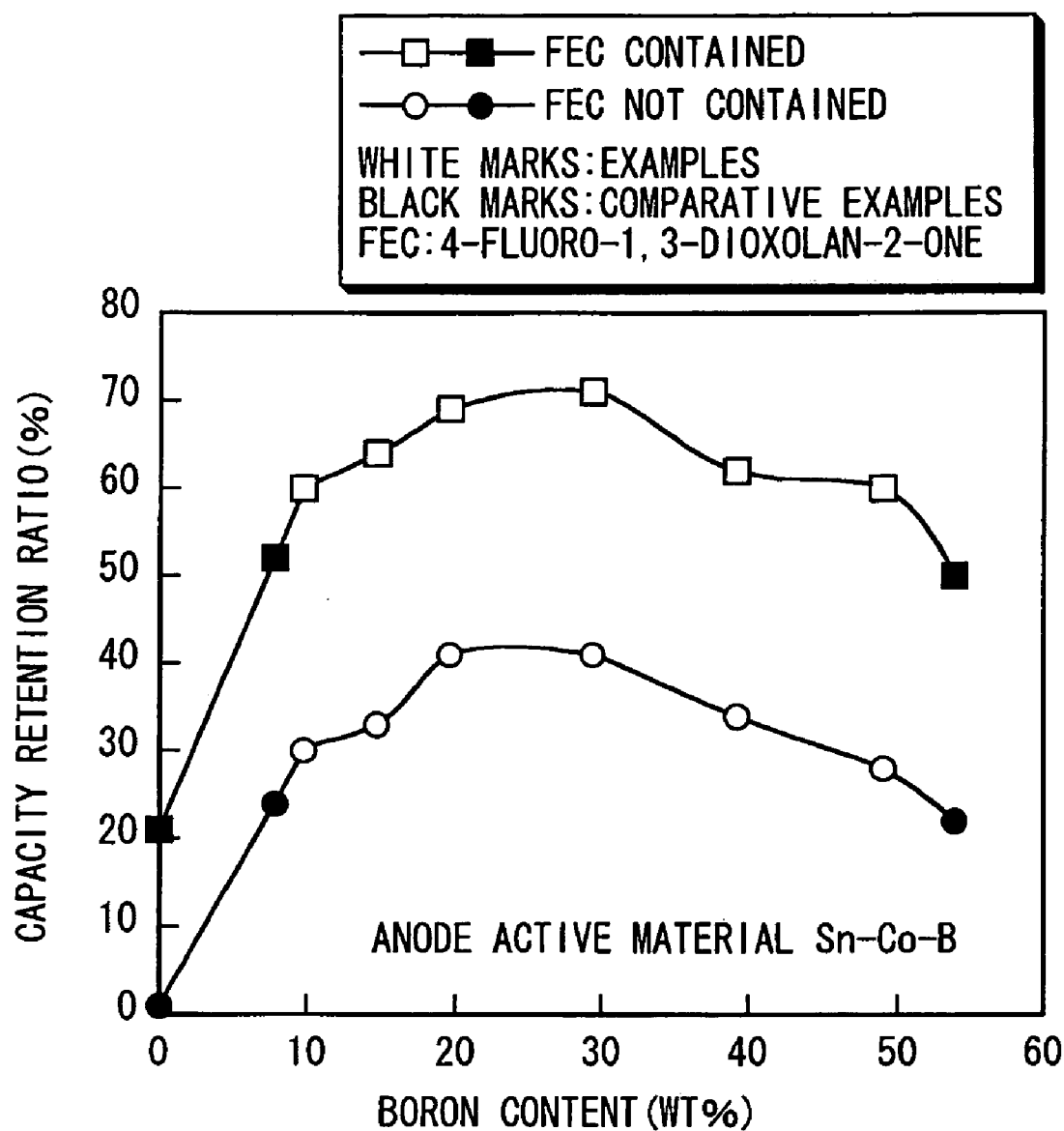
FIG. 12 is another characteristics view showing a relation between contents of boron in another anode active material and capacity retention ratios.
Figure 13:
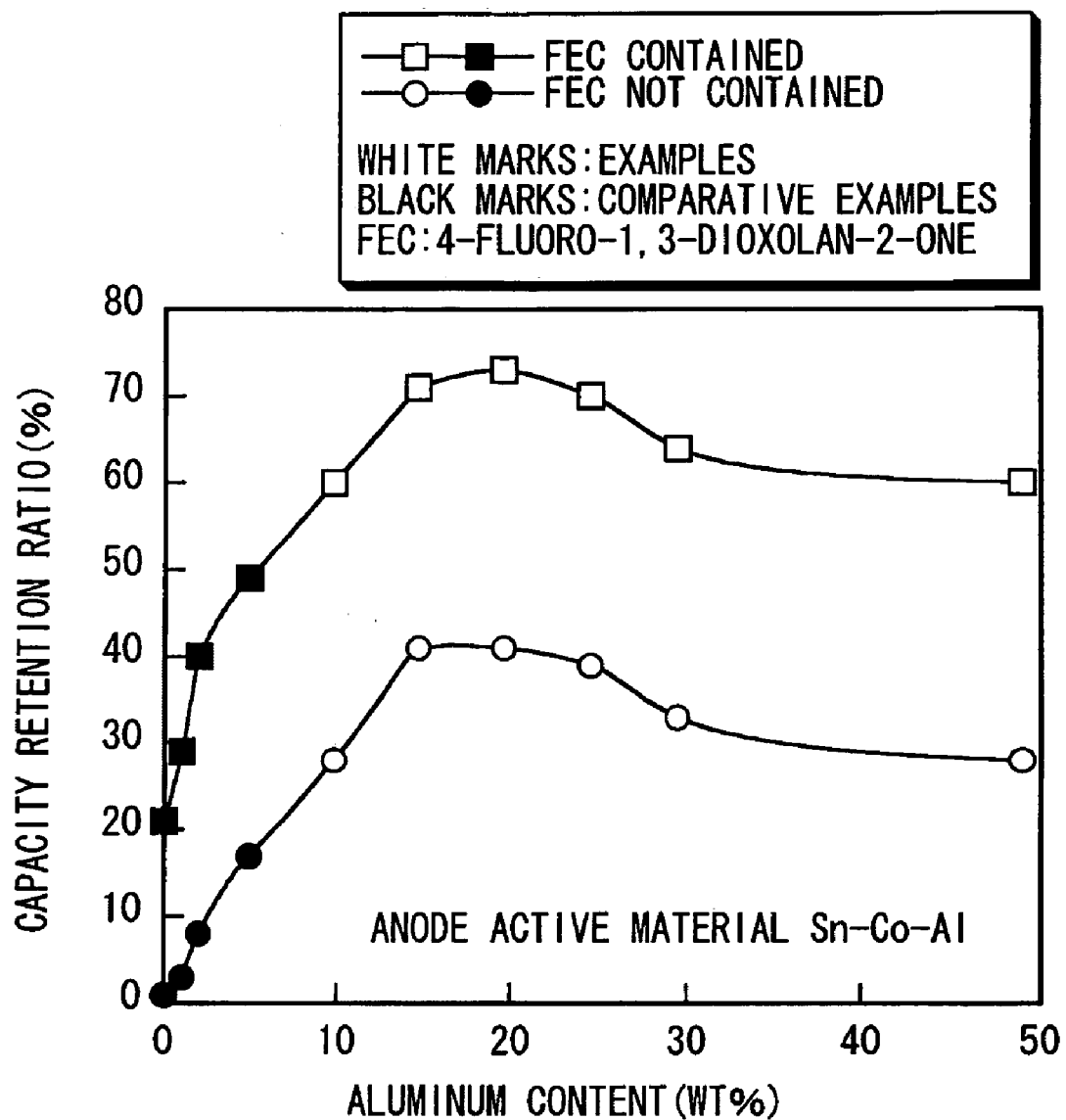
FIG. 13 is another characteristics view showing a relation between contents of aluminum in an anode active material and capacity retention ratios.
Figure 14:
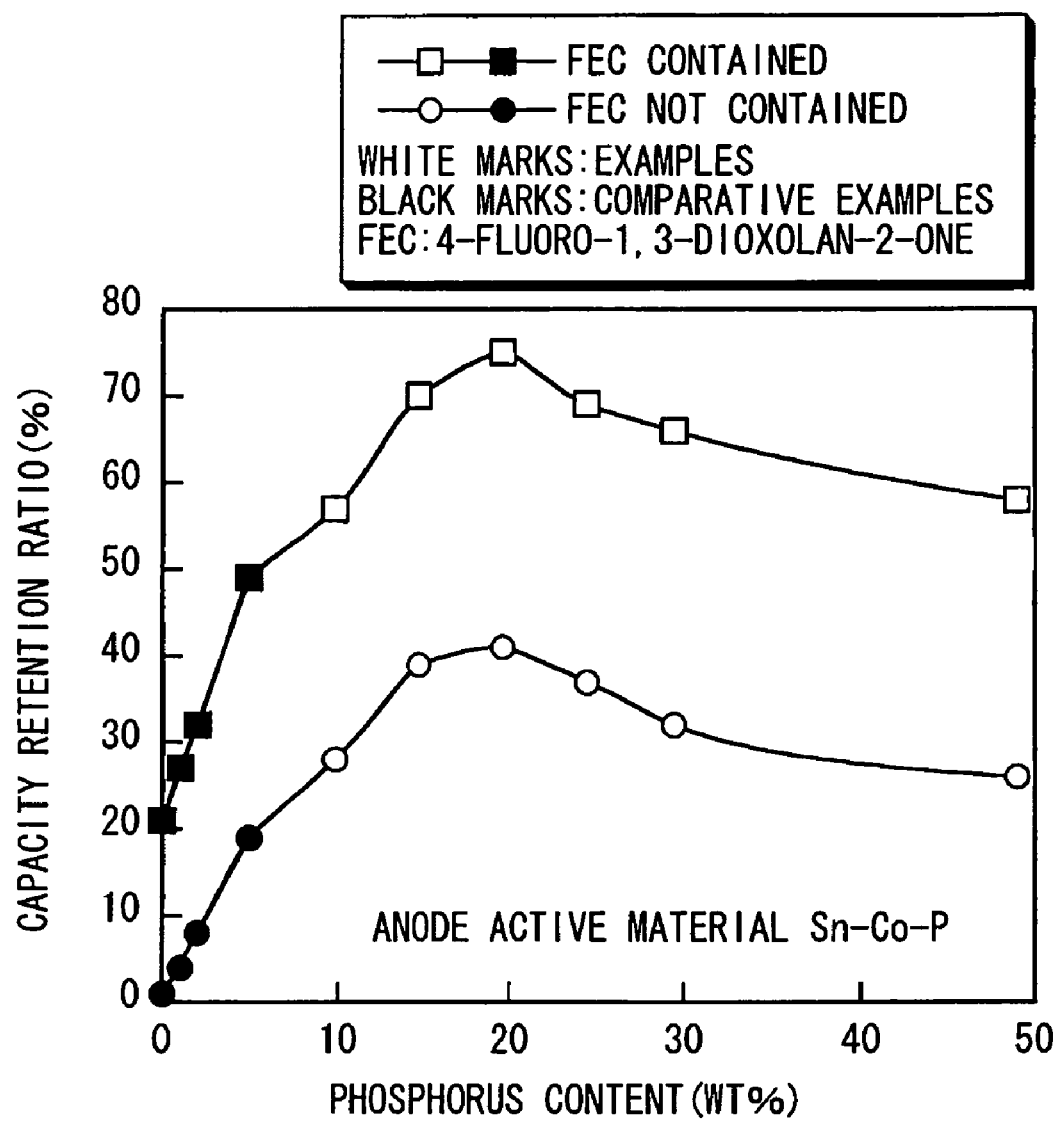
FIG. 14 is another characteristics view showing a relation between contents of phosphorus in an anode active material and capacity retention ratios.

As evidenced by Tables 24 to 29 and FIGS. 12 to 14, the results similar to of Examples 22-1 to 22-8 and 23-1 to 23-8 were obtained. That is, it was found that when the boron content, aluminum, or phosphorus in the anode active material was from 9.8 wt % to 49 wt %, cycle characteristics could be also improved, in particular, when the electrolytic solution contained 4-fluoro-1,3-dioxolan-2-one, cycle characteristics could be further improved.

Examples 30-1 and 31-1

Secondary batteries were fabricated as in Examples 22-1 to 22-8 and 23-1 to 23-8, except that the anode active material powders synthesized by mixing Sn—Ti alloy powders and carbon powders as raw materials at a ratio similar to of Example 11-2 was used.

Regarding the obtained secondary batteries of Examples 30-1 and 31-1, cycle characteristics were measured as in Examples 22-1 to 22-8 and 23-1 to 23-8. The results are shown in Tables 30 and 31.

TABLE 30

|  | Composition | Half bandwidth (°) | Capacity retention ratio (%) |
|---|---|---|---|
| Example 30-1 | 49Sn—29.4Ti—19.6C | 5 | 59 |
| Example 22-5 | 49Sn—29.4Co—19.6C | 5 | 59 |

Solvent: ethylene carbonate + propylene carbonate + 1,3-dioxole-2-one

TABLE 31

|  | Composition | Half bandwidth (°) | Capacity retention ratio (%) |
|---|---|---|---|
| Example 31-1 | 49Sn—29.4Ti—19.6C | 5 | 90 |
| Example 23-5 | 49Sn—29.4Co—19.6C | 5 | 92 |

Solvent: 4-fluoro-1,3-dioxolan-2-one + propylene carbonate + 1,3-dioxole-2-one

As evidenced by Tables 30 and 31, the results similar to of Examples 22-5 and 23-5 could be obtained. That is, it was found that even if as the third element, magnesium, titanium, vanadium, chromium, manganese, iron, cobalt, nickel, copper, zinc, gallium, zirconium, niobium, molybdenum, silver, indium, cerium, hafnium, tantalum, tungsten, or bismuth was contained, cycle characteristics could be improved, in particular, 4-fluoro-1,3-dioxolan-2-one was contained in the electrolytic solution, cycle characteristics could be further improved.

The present invention has been described with reference to the embodiment and the examples. However, the present invention is not limited to the embodiment and the examples, and various modifications may be made. For example, in the foregoing embodiment and examples, descriptions have been given with reference to the winding-structured secondary battery and the sheet-type secondary battery. However, the present invention can be similarly applied to a secondary battery having other shape using a package member such as a coin-type battery, a button-type battery, and a square-type battery, or a secondary battery having a structure other than the winding structure.

Further, in the foregoing embodiment and examples, descriptions have been given of the case using lithium as an electrode reactant. However, the present invention can be also applied to the case using other element in Group 1 in the long period periodic table such as sodium (Na) and potassium (K), an element in Group 2 in the long period periodic table such as magnesium and calcium (Ca), other light metal such as aluminum, or an alloy of lithium or the foregoing, as long as reactive to the anode active material, and similar effects can be thereby obtained. Then, the cathode active material or the nonaqueous solvent capable of inserting and extracting the electrode reactant can be selected according to the electrode reactant.

It should be understood by those skilled in the art that various modifications, combinations, sub-combinations and alternations may occur depending on design requirements and other factors insofar as they are within the scope of the appended claims or the equivalents thereof.

What is claimed is:

1. A battery comprising: a cathode; an anode; and an electrolyte, wherein:
   (a) the anode comprises an anode active material which comprises:
      (i) tin (Sn);
      (ii) a second element selected from the group consisting of boron (B), carbon (C), aluminum (Al), and phosphorus (P); and
      (iii) a third element selected from the group consisting of silicon (Si), magnesium (Mg), titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), and bismuth (Bi), wherein,
   the content of the second element in the anode active material is from 9.8 wt % to 49 wt %; and
   (b) the electrolyte comprises a solvent which comprises a cyclic ester carbonate derivative selected from the group consisting of the compounds of chemical formula 1 and the compounds of chemical formula 2,

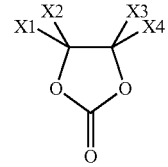

Chemical formula 1

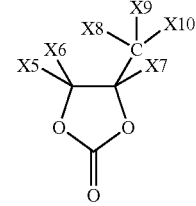

Chemical formula 2 wherein X1 through X10, represent any of a hydrogen group, a flourine group, a chlorine group, a bromine group and an iodine group, and X1 through X10, may be identical or different from each other but at least one thereof is a flourine group, chlorine group, bromine group or an iodine group.

2. A battery according to claim 1, wherein the content of the cyclic ester carbonate derivative having halogen atoms in the solvent is from 0.1 wt % to 80 wt %.

3. A battery according to claim 1, wherein as the cyclic ester carbonate derivative having halogen atoms, 4-fluoro-1,3-dioxolan-2-one is contained.

4. A battery according to claim 1, wherein a cyclic ester carbonate of an unsaturated compound is further contained in the solvent.

5. A battery according to claim 4, wherein the content of the cyclic ester carbonate of an unsaturated compound in the solvent is from 0.5 wt % to 10 wt %.

6. A battery according to claim 4, wherein as the cyclic ester carbonate of an unsaturated compound, at least one from the group consisting of 1,3-dioxole-2-one and derivatives thereof is contained.

* * * * *